United States Patent [19]

Cook et al.

[11] Patent Number: 5,239,624
[45] Date of Patent: Aug. 24, 1993

[54] PSEUDO-RANDOM POINT SAMPLING TECHNIQUES IN COMPUTER GRAPHICS

[75] Inventors: Robert L. Cook, San Anselmo; Thomas K. Porter, Fairfax; Loren C. Carpenter, Novato, all of Calif.

[73] Assignee: Pixar, Richmond, Calif.

[21] Appl. No.: 687,475

[22] Filed: Apr. 17, 1991

Related U.S. Application Data

[63] Continuation of Ser. No. 379,503, Jun. 21, 1989, Pat. No. 5,025,400, which is a continuation of Ser. No. 746,626, Jun. 19, 1985, Pat. No. 4,897,806.

[51] Int. Cl.$^5$ .......................... G09G 1/06; G09G 1/16
[52] U.S. Cl. ..................................... 395/125; 340/725; 340/728; 340/729; 395/126; 395/128; 395/131; 395/132; 395/152
[58] Field of Search .................. 364/518, 521, 522; 340/725, 728, 729, 747; 395/125, 126, 128, 131, 132, 152, 155, 161

[56] References Cited

U.S. PATENT DOCUMENTS

| | | | |
|---|---|---|---|
| T912,012 | 7/1973 | Appel et al. | 340/729 X |
| 3,441,789 | 4/1969 | Harrison, III | 340/729 |
| 4,205,389 | 5/1980 | Heartz | 364/521 X |
| 4,475,104 | 10/1984 | Shen | 364/521 X |
| 4,590,465 | 5/1986 | Fuchs | 340/729 X |
| 4,591,844 | 5/1986 | Hickin et al. | 340/728 |
| 4,609,917 | 9/1986 | Shen | 340/747 X |
| 4,677,576 | 6/1987 | Berlin, Jr. et al. | 340/723 X |
| 4,679,040 | 7/1987 | Yan | 340/728 X |
| 4,780,711 | 10/1988 | Doumas | 340/728 |
| 5,025,400 | 6/1991 | Cook et al. | 364/522 |

Primary Examiner—Heather R. Herndon
Attorney, Agent, or Firm—Hecker & Harriman

[57] ABSTRACT

A computer database contains visual and other information of an object scene from which a television monitor or film display is created by electronically sampling points of the object scene information in the computer memory. Undesirable effects of aliasing are significantly reduced and substantially eliminated by pseudo-randomly distributing, in a particular manner, the occurrence of the point samples in space and time. Realistic depth of field is obtained in the images, corresponding to what is observed through a camera lens, by altering the sample point locations to simulate passing them through an optical aperture in a pseudo-random distribution thereacross. Further, effects of illumination, shadows, object reflection and object refraction are made more realistic by causing each sample point to pseudo-randomly select one of a predetermined number of possible ray directions.

1 Claim, 3 Drawing Sheets

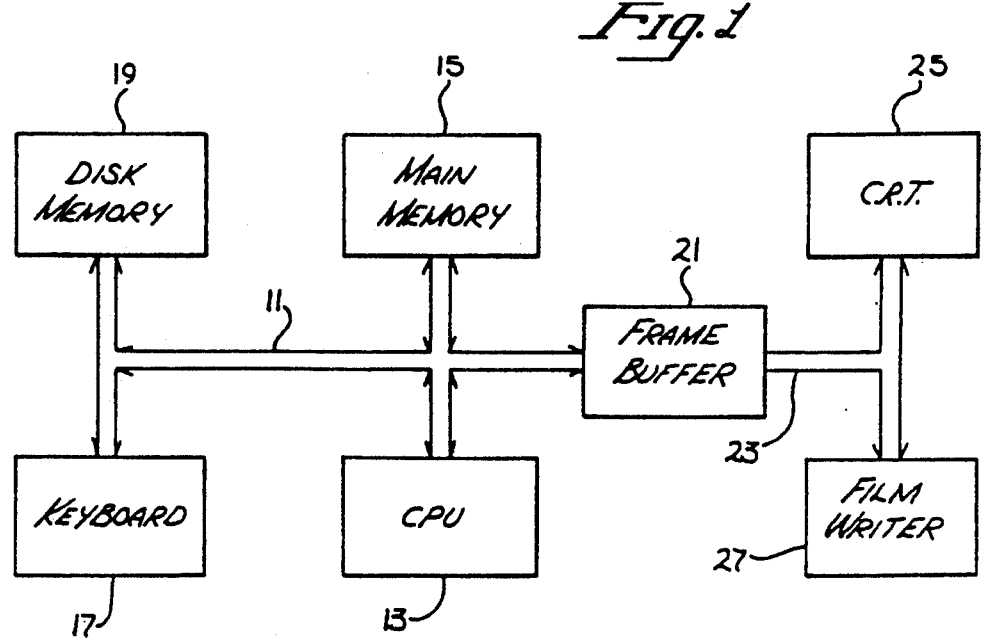
Fig. 1
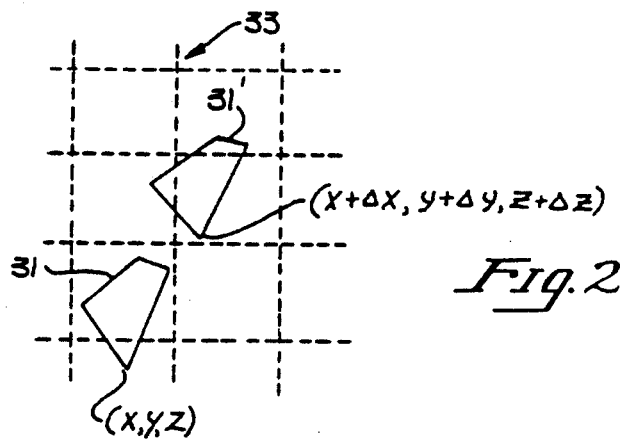
Fig. 2
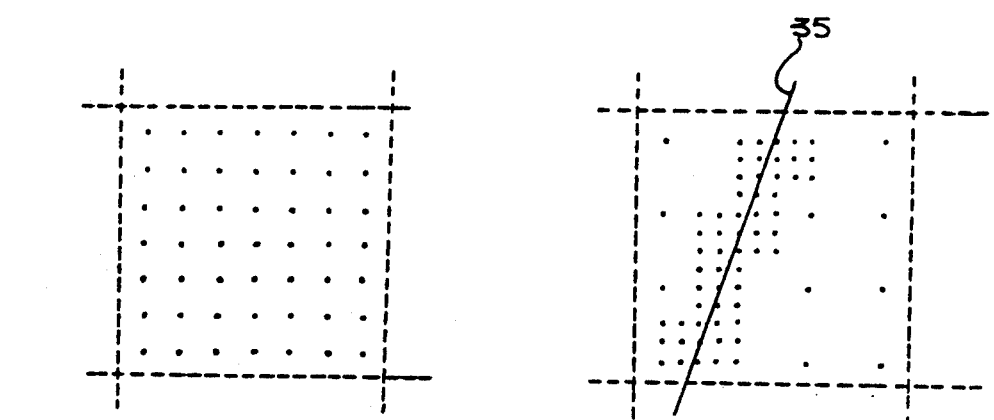
Fig 3 PRIOR ART
Fig. 4 PRIOR ART

PSEUDO-RANDOM POINT SAMPLING TECHNIQUES IN COMPUTER GRAPHICS

This is a continuation of application Ser. No. 379,503, filed on Jun. 21, 1989, now U.S. Pat. No. 5,025,400 which is a continuation of U.S. application Ser. No. 746,726, filed on Jun. 19, 1985, now U.S. Pat. No. 4,876,806.

BACKGROUND OF THE INVENTION

This invention relates generally to the art of computer graphics, and more specifically to the field of point sampling of visual scene information for the purpose of reconstructing an image of the visual scene.

One form of computer graphics that is becoming widely practiced is to develop the sequence of video image frames of a moving object scene from information of the scene that has been stored in a computer memory. The object scene database contains information of the visual characteristics of the object scene, such as color, as well as information of movement. The creator of a sequence of video frames then uses a computer to electronically assemble signals of each video frame from the database in a manner that provides the views and movement of the object scene that is desired by the operator to be displayed.

The electronic signal for each video frame is typically developed by electronic sampling of the object scene database. A separate set of digital signals is developed to represent the color and/or intensity of each pixel of a standard raster scanned video monitor, for each video frame produced. Each pixel is thus the smallest resolution element of the video display. The color and/or intensity of each pixel is determined by sampling the database information to determine the characteristics of the object scene at the location of a given pixel. Such sampling is generally done by averaging the object scene information over a certain portion of the area of the pixel, or, more commonly, to sample the information at one or more points within the pixel, usually in some form of a periodically repeating pattern.

Recent developments in the field of computer graphics have been directed to increasing the realism of the resulting images. Progress has been made in more faithfully reproducing object textures, shadows, reflections and transparencies, for example. Much effort has been directed to the problem of aliasing, as well. Existing sampling techniques tend to generate video image frames having "alias" images; that is, images that appear to be real but which are not specified in the computer database. This is generally recognized as a characteristic of images formed through variously used point sampling techniques.

Therefore, it is a general object of the present invention to provide computer graphics techniques that further improve the realism of the resulting video image frames and the totality of video productions generated from computer database representations of an object scene.

SUMMARY OF THE INVENTION

This and additional objects are accomplished by the present invention wherein, briefly and generally, the object scene information in the computer database is sampled by points that are pseudo-randomly distributed in one or several functions or dimensions. According to one aspect of the invention, the point samples are pseudo-randomly distributed in a particular manner across the video image plane being constructed. According to another aspect, the pseudo-random distribution of point samples is taken over the time that is occupied by the video image frame being constructed. This substantially reduces or eliminates the undesirable aliasing, both spatially and temporally. The distribution of samples over time also increases the realism of the video frame by adding the image blurring that would occur if the object scene was being photographed according to usual techniques.

According to another aspect of the present invention, a video frame is constructed to have a depth of field by sampling the data base as if the object scene represented by it is being viewed through a lens of a limited aperture that will view in focus only a limited depth of the object scene. The point samples are pseudo-randomly directed over a defined lens aperture when sampling the database information.

According to another specific aspect of the present invention, reflective and transparent characteristics of an object are taken into account by recognizing the degree of diffusion that occurs at each sample point. A particular angle of reflection or refraction is pseudo-randomly selected for each sample point from a range of possible angles depending upon the object characteristics. This adds realism to the resultant image by recognizing the diffuse, blurry nature of reflections and translucency that is possessed by most real objects.

According to yet another aspect of the present invention, an intensity distribution is specified for a light source that is illuminating the object scene. A single light source ray is pseudo-randomly selected from the specified light source distribution, for each sample point. This technique has the advantage of eliminating harsh shadows that result from existing techniques, further adding to the improved realism of the images, when a light source is only partially obscured.

Additional objects, advantages and features of the various aspects of the present invention will become apparent from the description of its preferred embodiments, which description should be taken in conjunction with the accompanying drawings.

BRIEF DESCRIPTION OF THE DRAWINGS

FIG. 1 illustrates generally a computer system that is suitable for carrying out the various aspects of the present invention;

FIG. 2 illustrates one possible form of object scene information that is stored in the computer memories of FIG. 1;

FIGS. 3 and 4 illustrate two existing point sampling techniques;

FIG. 12 illustrates generally the distribution of the point samples over time;

FIGS. 13, 14, 15 and 16 illustrate several specific embodiments of the pseudo-random time sampling aspect of the present invention;

FIG. 17 illustrates generally computer database sampling by a given distribution of sample points on an image plane;

FIG. 18 shows a sampling technique that provides an image with a depth of field;

FIG. 19 is a ray tracing example for a single sample that includes the effects of reflection, refraction and light source distribution;

FIGS. 20, 21 and 22 illustrate additional details of the example shown in FIG. 19; and FIG. 23 provides yet another application of the general techniques of the present invention.

DESCRIPTION OF THE PREFERRED EMBODIMENTS

Figure 5:
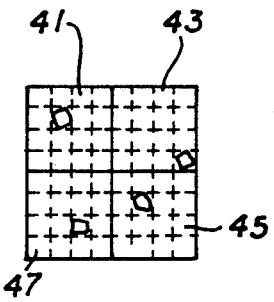
FIGS. 5, 6 and 7 show three specific embodiments of the pseudo-random spatial techniques of the present invention.

Referring initially to FIG. 1, a general computer system as illustrated that is suitable for carrying out the various aspects of the present invention to be described in detail below. A common bus 11 is connected to a central processing unit (CPU) 13 and main memory 15. Also connected to the bus 11 is keyboard 17 and a large amount of disk memory 19. Either a commercially available VAX-11/780 or Cray large computer system is satisfactory. A frame buffer 21 receives output information from the bus 11 and applies it, through another bus 23, to a standard color television monitor 25 or another peripheral 27 that writes the resulting image frames directly onto film, or both. Additionally, an output device can simply be a videotape recorder of the standard type.

FIG. 2 illustrates the organization of the information of the object scene that is maintained in memory in the computer system of FIG. 1. There are many ways to store such information, one being selected for illustration in connection with the present invention. This technique involves breaking down the object scene into components, these elements being referred to herein as geometric primitives. One such geometric primitive is a polygon 31, for example, illustrated in FIG. 2 within an overlay 33 that shows in dotted outline a few adjacent pixels of the resulting display. The resulting display, of course, shows the color and intensity of the object scene within each pixel to be uniform, the size of the pixel being the resolution element size of display. The polygon represents portions of the object scene to be represented in a video frame.

The information stored in the computer memory for each object polygon is as extensive as necessary for producing a particular quality video image frame. Its position certainly must be a piece of that information, conveniently specified by the x, y and z coordinates. The x, y and z coordinates of each of the corner points of the polygon are stored for each video frame to be constructed, as shown in FIG. 2 with respect to the polygon 31. The "x" and "y" numbers represent, of course, the horizontal and vertical positions, respectively, of the points, while the "z" number specifies its distance behind the video frame (image plane) being constructed.

In order to be able to sample movement of the object scene that occurs in the time period of one image frame, a technique described in detail below, information is also maintained for each polygon of its movement during such time period. In FIG. 2, a second position 31' of the same polygon is illustrated with its corner point coordinates being stored as incremental changes over that of their initial positions. The position shown for the polygon 31 is preferably, for example, that at the beginning of a video frame, while the position 31' is that at the end of the video frame. The polygon can also change its shape during this time period.

Besides the positions of each object surface polygon being stored in the data base, certain visual characteristics are stored for each, as well. These include separate red, green and blue color reflection signals, red, green and blue transparency signals, extent of light diffusion upon reflection, extent of light dispersion upon transmission through the surface, and similar characteristics. The use of these and others are explained below in connection with the techniques of the present invention.

Referring to FIG. 3, a commonly used technique for determining the color and/or intensity of each pixel of the image frame is illustrated. The information in the computer database, in this example that of the polygons illustrated in FIG. 2, that is present in the space occupied by a particular pixel is determined for a plurality of points within the pixel. A large number of points are illustrated in FIG. 3, being periodically distributed in both dimensions, but there are even some techniques that use only one or a very few sample points per pixel. The nature of the object scene in each such sample point is determined, and those determinations are combined in some manner, such as by weighted or unweighted averaging, in order to determine the color and intensity of that pixel of the image frame.

FIG. 4 illustrates a similar periodic point sampling technique, except that not all point samples are taken in each case. Rather, the full density of the periodic sampling pattern is employed only in regions of a pixel where changes in the object scene occur, such as represented by a line 35. This image dependent technique thus reduces the number of samples and the processing time required.

But these and other periodic sampling techniques result in reconstructed images that include "aliases" of the real image to be displayed. Much effort has been directed to anti-aliasing techniques, one approach being to process the video signal obtained from a periodic pattern point sample technique in order to eliminate the aliasing effects of the technique. Others have suggested sampling in a non-periodic, dithered manner for a number of specific sampling applications. The techniques of the present invention include improvements to and new applications of such prior approaches.

Figure 6:
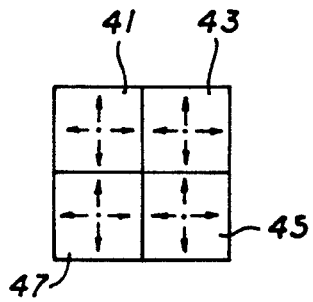
Figure 7:
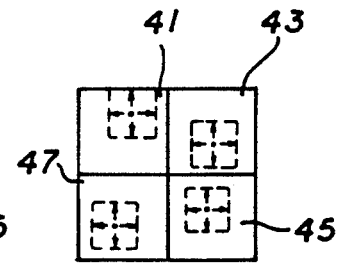
Figure 8A:
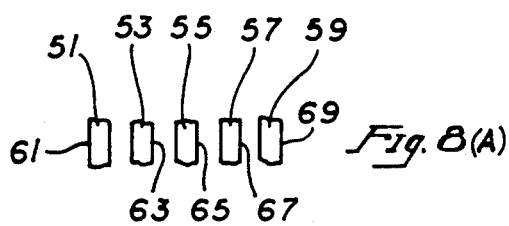
FIGS. 8(A) through 8(E) illustrate spatial aliasing of the prior art techniques of FIGS. 3 and 4.
Figure 8B:
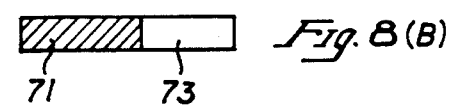
Figure 8C:
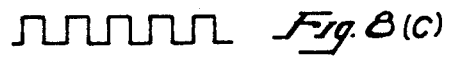
Figure 8D:
Figure 8E:
Figure 9A:
FIGS. 9(A) through 9(E) illustrate the improvement brought about by the pseudo-random point sampling techniques of the present invention.
Figure 9B:
Figure 9C:
Figure 9D:
Figure 9E:
Figure 10A:
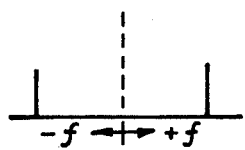
FIGS. 10(A) through 10(E) show a Fourier transform of a periodically sampled signal.
Figure 10B:
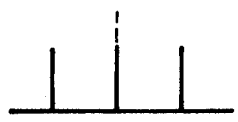
Figure 10C:
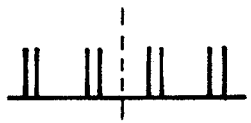
Figure 10D:
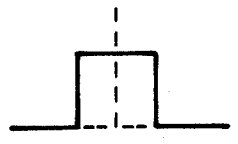
Figure 10E:

Three different specific pseudo-random sampling techniques are illustrated in FIGS. 5, 6 and 7, wherein a single pixel is illustrated and, for simplicity of illustration, only four point samples per pixel are described. However, an actual implementation would likely use sixteen, or even as many as sixty-four samples per pixel, if all of the aspects of the present invention are utilized. For other specific implementations, a lesser number of samples, such as one per pixel, could be utilized. But in any event, the pattern of point samples, both within each pixel and across the face of the image frame in its entirety, are non-periodic, and form a non-rectangular and non-rectilinear grid pattern. Further, each selected sampling pattern may, alternatively, extend over an area of multiple pixels or only part of a pixel. But the examples described herein use a sampling area coincident to that of one pixel, for simplicity of explanation.

Each of the embodiments of FIGS. 5, 6 and 7 determines the location of the sample points within the pixel by first dividing the pixel into a number of nonoverlapping areas equal to the number of sample points, in this case four. A sample point is confined within each such area, thus aiding in keeping the sample points spread out. The four areas of the pixel are labeled in the Figures as numbers 41, 43, 45 and 47. The areas are shown to be rectangular but can be some other shape.

In the embodiment of FIG. 5, the location of the sample point for each of these four areas is pseudo-randomly determined. Ideally, the "random" numbers to be used to determine their locations are purely randomly, but since they are so determined by computer, there is some element of repetitiveness of sample position within its defined area, although the distribution of locations of a large number of sample locations matches that of a random distribution. The most common way for a computer to generate the x,y coordinates of each sample point is to use a look-up table maintained in memory that has a list of numbers with a distribution being that of a random set of numbers. But the usual technique is for the computer to step through the table of numbers in sequence, so there are some repetitions since the table of numbers has finite length. However, the length of the list of numbers can be quite large so that repetition does not occur for a significant number of sample points. But in order to adequately describe both a completely random selection of sample locations and one controlled by such a computer look-up table, the locations are referred to here in this description as "pseudo-random".

In an implementation of the technique of FIG. 5, the same sample pattern is used on every pixel in a given image frame. It is preferable, however, to eliminate all periodicity of the sample pattern, including making sure that no two adjacent pixels have the same sample pattern. This can be done by using a sufficiently long look-up table of random numbers. It is preferable to generate a sample pattern with no two adjacent pixels (including those diagonally adjacent) having the same pattern, a result of the techniques shown in FIGS. 6 and 7.

Referring to FIG. 6, each of the four non-overlapping areas of the pixel illustrated has a reference point positioned at a fixed location in each, such as its middle. Each actual sample point location is then determined by the computer by adding a random positive or negative number to each of the reference point's x and y coordinates. These offset numbers are randomly determined, such as from the computer random number look-up table, and so repetition of the pattern would not occur for some very large number of pixels.

Another application of the same offset technique is a combination of the techniques of FIGS. 5 and 6, as shown in FIG. 7. This is similar to that of FIG. 5 and differs from that of FIG. 6 by having its reference points distributed rather than fixed in the middle of the adjacent pixel areas. The reference point pattern of the embodiment of FIG. 7 may be the same for each pixel, but the actual point sample locations are determined by adding a positive or negative x,y coordinate offset increment to the coordinates of each reference point. For convenience, a limit is placed on the maximum offset of each, as indicated by the dotted outline around each of the reference points of FIG. 7. The sample points in the embodiment of FIG. 6, however, can be located anywhere within its respective portion of the area of the pixel.

By first defining non-overlapping areas in which a single sample point lies, bunching up of sample points is avoided. It can be visualized that if each of the four sample points could be positioned anywhere within the entire pixel, there would be occasions, because of the random selection of those specific locations, where two or more of the sample points would be bunched together. Although defining a range of potential point sample locations to be within a non-overlapping area accomplishes this, there could obviously be some variations of this specific technique, such as by allowing the areas to overlap slightly, or some other variation. It may even cause no problem in particular applications if the sample points are chosen in a manner that their bunching together does occur occasionally.

Each of the specific techniques described with respect to FIGS. 5, 6 and 7 provides a picture sampled from a computer database that has fewer aliased images than if a periodic point sample distribution is utilized. The technique shown in FIG. 5, wherein the same pattern is repeated for each pixel of the image frame, provides some improvement, but the techniques according to FIGS. 6 and 7 are significantly better in reducing aliasing. The technique of FIG. 7 has been observed to be the best of the three because it has an additional advantage of being less noisy.

Referring to FIG. 8, an example of how an aliased image can be obtained and displayed is given. FIG. 8(A) is a "picket fence" image of "slats" 51, 53, 55, 57 and 59. This image is being sampled by a periodic distribution of points 61, 63, 65, 67 and 69, shown only in a single dimension for simplicity. Since the period of the sample points is greater than that of a periodic intensity variation of the image, all of those variations will not be faithfully reproduced. FIG. 8(B) shows the image of a video display that is developed from the samples of FIG. 8(A), region 71 being of one intensity and region 73 being of the other. Of course, the image of FIG. 8(B) is not a faithful reproduction of the image of FIG. 8(A). But since three of the sample points hit a portion of the image having one intensity and the other two a portion of the image having the other intensity, the detail of the other variations cannot be faithfully reproduced. The curve of FIG. 8(C) represents the intensity variation of the image of FIG. 8(A), the curve of FIG. 8(D) being the sampling function, and the curve of FIG. 8(E) illustrating the resulting image of FIG. 8(B).

One way that has been suggested to avoid forming such alias images is to increase the number of sample points so that the detail can be captured. That is to say, increase the number of samples in order to increase the well-known Nyquist limit. But to use extra sample points for this increases the computational complexity and can never really solve the problem; it only reduces its appearance somewhat. No matter how many samples are used, however, there will always be some situations of aliasing, particularly when the scene is changing. In this case, such a picket fence can show as a flashing black-and-white image over a large area, a very undesirable result.

Referring to FIG. 9, the effect of a randomly distributed pattern of sample points is illustrated. FIG. 9(A) assumes the same "picket fence" image in the computer database, as with FIG. 8(A). But the sample points in FIG. 9(A) are distributed non-periodically so that the resulting image of FIG. 9(B) appears to be gray rather than having large areas that are all white or all black. The image of FIG. 9(B) appears gray since alternate portions of the image are black-and-white, rather than having large areas of each color as in FIG. 8(B). Further, as the point samples of FIG. 9(A) are scanned relative to the "picket fence" image, there will be some noisy visual effect, similar to film grain noise, but one of considerably less annoyance than a large area flashing black or white. The noise level is controlled by the number of samples per unit area.

FIGS. 10 and 11 show in the frequency domain the effect of periodic and stochastic point sampling, respectively. In both of FIGS. 10 and 11, curves (A) are the same, being an original signal, chosen to be a sine wave in the space domain. Curves (B) differ, however, in that FIG. 10(B) shows the frequency distribution of a spatially periodic sampling pattern, while FIG. 11(B) shows the frequency distribution of the ideal stochastic sampling pattern. In both cases, the sampling frequency is assumed to be below the Nyquist limit of the original signal, so will not be able to faithfully reproduce the original signal. But the comparison of the curves of FIGS. 10 and 11 show the anti-aliasing effect of a random distribution. The spatial sampling distribution across the image is preferably chosen so that a Fourier transform of such a distribution over an infinite plane approximates a Poisson disk distribution, as shown in FIG. 11(B). The primary characteristics of such a distribution include a very high level at zero frequency, a substantially zero magnitude to a certain frequency (both positive and negative), and then a substantially constant magnitude at higher frequencies. Except at zero frequency, the sampling function in the frequency domain (FIG. 11(B)) is substantially continuous. Such a distribution in the frequency domain provides the desired spatial position randomness and avoids bunching of the sample points. The techniques described with respect to FIGS. 5–7 approximate such a distribution.

The distribution (C) in each of FIGS. 10 and 11 shows the sampled signal in each of those examples, the result of convolving the signal of curve (A) with the sampling distribution of curve (B). In the periodic spatial sample example of FIG. 10, a number of extraneous spikes are obtained since each of the sampling spikes of FIG. 10(B) is individually convolved with each of the spikes of the signal of FIG. 10(A). Since the frequencies of the signal of FIG. 10(A) are in excess of that of the sampling function of FIG. 10(B), the sampled signal of FIG. 10(C) is not a faithful reproduction of that of the original signal. When the sampled signal of FIG. 10(C) is displayed, it is in effect multiplied by a lowpass filter similar to that of of FIG. 10(D). The resultant sampled signal is shown in FIG. 10(E), which is the portion of the signal of FIG. 10(C) which is within the band pass of the filter function of FIG. 10(D). The signal indicated at FIG. 10(E) is capable of reconstructing alias images that bear little or no resemblance to that of the original signal which was sampled.

Figure 11A:
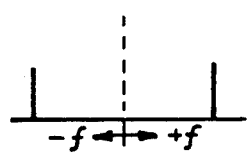
FIGS. 11(A) through 11(E) show a Fourier transform of a pseudo-randomly sampled signal.
Figure 11B:
Figure 11C:
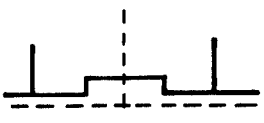
Figure 11D:
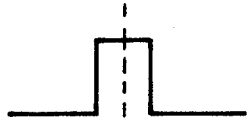
Figure 11E:
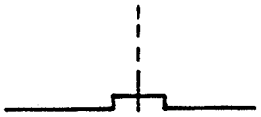

The sampled signal of FIG. 11(C) also does not correspond with the original signal of FIG. 11(E), but when multiplied by its filter characteristics of FIG. 11(D), the resultant sampled signal of FIG. 11(E) is uniform over the frequency range of the filter. This produces in an image white noise, which is much preferable to reconstructing an apparent genuine image that does not exist.

The techniques described with respect to FIGS. 5–7 can also be utilized in a sampling system that modifies the sampling pattern in response to the content of the image information being sampled, so called adaptive sampling. For example, if image changes or detail within a portion of a sampling area required it, the pattern of sample points can be repeated in such an area portion in reduced scale.

According to another aspect of the present invention, similar sampling techniques are employed over time in order to add realistic motion blur, such as exist in video and film techniques. Referring initially to FIG. 12, the example pixel of FIGS. 5–7 is indicated to have each of its four samples taken at different times t1, t2, t3 and t4, regardless of the specific technique used to spatially locate the point samples. These times are selected to be within an interval that corresponds to a typical shutter opening for video frame acquisition which these techniques are intended to simulate. Therefore, if there is movement of the objects during the interval of a single frame indicated in the computer database, then the resultant image of that frame reconstructed from the samples being taken of the database information will similarly show motion blur.

In order to reduce or substantially eliminate temporal aliasing, the distribution in time of the samples over the frame interval is pseudo-randomly determined. Referring to FIG. 13, a time line is given wherein four non-overlapping intervals of time are designated as boundaries for each of the four sample points to occur. A pseudo-random selection of the time for each sample within each of these intervals is what is shown in FIG. 13. The same time distribution in FIG. 13 could be used for each pixel of the image frame being constructed, but is preferable that the sample times be different for at least each of immediately adjacent pixels, in order to maximize the anti-aliasing that is desired. Temporal aliasing can occur when changes occur in the scene, such as a flashing light, more rapidly than samples are being taken. It will also be recognized that the distribution in time illustrated in FIG. 13 involves the same considerations as the spatial distribution described with respect to FIG. 5.

Similarly, FIGS. 14 and 15 illustrate pseudo-random temporal sampling that is carried out in the same way as the spatial sampling described with respect to FIGS. 6 and 7, respectively. In FIG. 14, the time of each sample is chosen to be a pseudo-randomly determined offset from the center of the interval designated for each sample to occur. In FIG. 15, a reference time is pseudo-randomly determined for each sample within its interval, and then the actual time for each sample is determined as a shift from this reference an amount that is pseudo-randomly determined within certain limits. In each case, the time distribution of the samples is such that its Fourier transform preferably approximates a Poisson disk distribution, in the same manner as discussed above with respect to FIG. 11(B) for the samples' spatial distribution.

The time intervals set aside for each of the samples need not always be non-overlapping. An example of overlapping intervals is given in FIG. 16, the exact sample time being selected according to either of the techniques of FIGS. 14 or 15. But the difference in the example of FIG. 16 is that the probability is increased of the samples being weighted in the middle of the time interval of the image frame. This simulates a film shutter that opens and closes relatively slowly so that motion of the object scene during the middle interval of the shutter opening contributes more to the intensity of the resulting blurred image than does motion occurring near the shutter opening or closing. Regardless of which of the specific techniques for determining the time distribution of the samples of a particular pixel are used, the total time period in which all of the samples of all pixels of a given image frame are taken is the same specified time interval represented in FIGS. 13-16 by the length of the time lines.

Referring to FIG. 17, a method is illustrated for sampling the polygons of the object scene in the computer database by the spatial and temporal sampling techniques described above. A pixel 81 is shown, as an example, as one of a large number combined together to form an image on a video screen (image plane). Rays 83 and 85 are projected behind the image plane from each of two of the point samples within the pixel 81. The spatial location of these point samples has been determined by one of the techniques described above. Their individual rays are then projected, usually perpendicularly to the image plane, to determine the nearestmost polygons that are intersected by the rays at their selected time of sample. Much work has been done on such ray tracing techniques and involves a significant computer sort and matching of the x,y coordinates of the sample points with those of the polygons in the computer database at the instant designated for the taking of each sample. Usually, more than one polygon will exist at each x,y sample location, so the computer also determines from the "z" information of them which is the closest to the image plane, and that is then the one that provides the visual information (color, etc.) of the object scene at that point. All of the visual characteristics determined for each of the samples of a given pixel are then averaged in some manner to form a single visual characteristic for that pixel for display during that frame.

Most computer graphics techniques show the entire object scene for each frame in focus, as if it was being viewed through a pinhole camera. This, of course, is not an accurate simulation of the real world of cameras and lenses, which have a limited depth of field. Depth of field can be taken into account by a ray tracing technique illustrated in FIG. 18. A single pixel 87 has two sample points with rays 89 and 91 extending from them behind the image plane. The depth of field technique illustrated in FIG. 18 is independent of the spatial and temporal sampling techniques described above, but it is preferable that those techniques be used in combination with the depth of field techniques being described in order to maximize the realism of the resulting image frames.

The example rays 89 and 91 of FIG. 18 do not extend directly behind the image plane, as was described with respect to FIG. 17, but rather are directed to intersect a simulated lens 93 at points 95 and 97, respectively. These rays then are directed again toward each other, under influence of refraction of the simulated lens. The rays intersect a focal plane 99 of the simulated optical system in the same pattern as exists on the image plane, as a result of defining the simulated optical system. The sample point rays 89 and 91 will then intersect polygons 101 and 103, respectively. Only polygons within the cone 105, shown in dotted outline, will be intersected with rays from sample points of the pixel 87, as defined by the characteristics of the optical system. Those polygons that are close to the focal plane 99 will contribute to a focused reconstructed image, while those further removed from the focal plane 99 contribute to an unfocused reconstructed image. In a computer software implementation of this technique, it has been found preferable to shift the x,y coordinates of the polygons an amount dependent upon their z distance from the focal plane 99 and the characteristics of the simulated optical system, and then proceed with the sampling in a manner similar to that shown in FIG. 17.

But whatever specific implementation is carried out, the technique has the advantage of adding considerable realism to the simulated image at the time that the image is first formed by sampling the database. Intersection of sample rays with the simulated lens 99 occurs over its entire defined aperture. In order to further reduce aliasing, the location of points of intersection of the rays with the lens, such as the points 95 and 97 shown in FIG. 18, are pseudo-randomly determined in the same manner as the earlier described pseudo-random determination of the spatial location and time of each sample point.

Other unrealistic effects that result from the use of existing computer graphics techniques are sharp shadows, glossy reflections, and, if translucency of objects is taken into account at all, that also results in sharp images showing the translucent objects. This, of course, is not the real world of diffuse objects and extended light sources, but are required simplifying assumptions under previous algorithms in order to maintain within reason the complexity of the calculations. But the distributed techniques of the present invention can also be applied to these tasks, in a similar manner as described previously, to add these realistic considerations. Referring to FIG. 19, a single ray 111 is traced from a single sample on the image plane (not shown) and interacts with the object scene in a manner specified by the characteristics of the light sources and object surfaces that are specified in the database. The techniques described with respect to FIG. 19 are independent of the techniques described earlier, but, of course, maximum realism is obtained if all of these techniques are combined together. What is to be described with respect to FIG. 19 occurs with each sample point of a particular image frame.

The ray 111 is first determined to strike a surface 113 of the object scene, as specified by one of the polygons whose characteristics are stored in the computer database. If this part of the object scene surface is reflective, a reflective ray 115 is then traced until it intersects another object scene surface 117. The object surface portion 117 may be observed in the completed image frame as a reflection in the object scene portion 113. But stored in the computer database is a diffusive light spread of the surface 113, as indicated by dotted outline 119 and shown separately in FIG. 20. If the characteristics of the surface 113 are specularly reflecting, such as occurs with a mirror, the spread of possible ray reflection angles will be limited to essentially one. But most objects have some degree of diffusion and will scatter light incident upon them. Therefore, each sample point ray is traced in a manner to select one of the possible reflection angles, thereby to result in a realistic blurry reflection from diffusely reflecting surfaces since subsequent rays will be reflected off the surface 113 at one of the other possible angles shown in FIG. 20. The possible ray reflection angles, as shown in FIGS. 19 and 20, are weighted in one direction, as is actually the case in diffusely reflecting surfaces. And, as before, the particular direction taken by any given ray 115 is pseudo-randomly selected from the possible reflection angles.

The same consideration works in determining an angle of transmission of a ray 121 through the surface portion 113 if that surface portion is at all translucent. Assuming that it is, possible angles of refraction are stored in the computer database for that particular polygon, the distribution of such angles being indicated at 123 in FIG. 19 and also shown in FIG. 21. The spread of possible refractive angles depends, of course, on how diffuse the translucency is. Plain glass, for example, will have a very narrow range of refractive angles, if not a single angle. And once the ray 121 is pseudo-randomly selected for a given sample point from the possible refractive angles, another portion 125 of the object scene can then be determined which is intersected by the ray 121 and is partially visible through the object portion 113.

In order to avoid sharp shadows, the realistic characteristics of an object scene illuminating light source 127 is taken into account. As shown in FIGS. 19 and 22, the light source 127 has a finite extended dimension, and is not always a point as often assumed in present computer graphics techniques. A ray 129 is traced from the illuminated surface 113 back to the source 127 to see if there is any other portion of the object scene, such as the portion 131, that will cause a shadow to be cast on the surface 113. As shown in the example of FIG. 19, the ray 129 will detect no such shadow, but other possible ray directions, as shown in FIG. 22, will be in the path of the object portion 131 and thus indicate that the object 113 is not illuminated by the source 127. The particular direction of the ray 129 is pseudo-randomly selected from those possible directions specified for the source 127, as shown in dotted outline in FIG. 22. In the example of FIG. 19, some of the rays will intersect the object portion 131 and some will not, resulting in soft, realistic shadows in the resulting image frame.

It will be recognized that each of the secondary surfaces intersected by rays, such as the surfaces 117 and 125 of FIG. 19, may also have reflective and translucent properties. The process is continued until such reflected or transparent images are so small in intensity as not to make any difference in the resulting image being constructed.

Referring to FIG. 23, an example is given of the board extent of the techniques described above that are a part of the present invention. The techniques can be used to determine a center of mass of an object, an example of something that is desirable to be determined in the course of computer aided design (CAD). An object 141 of FIG. 23 has its surfaces determined by a pseudo-random distribution of sample points, shown to extend through the object in dotted outline. The pseudo-random nature of this sampling assures that the measurement will be made on the actual object 141 and not some alias image of it.

The various techniques of the present invention have also been described by the inventors in a published paper, "Distributed Ray Tracing", *Computer Graphics*, Vol. 18, No. 3, pages 137-145, July, 1984, which is incorporated herein by reference. This paper includes photographs of images generated with the use of the various aspects of the present invention. The result of motion blur, as described with respect to FIGS. 12-16, is shown in FIGS. 3, 6 and 8 of that paper. Computer generated images having a depth of field are shown in FIGS. 4 and 5 of that paper, having been made by the techniques described with respect to FIG. 18 herein. FIG. 7 of that paper illustrates the shadowing and reflection techniques of the present invention that were described with respect to FIGS. 19-22 above.

Appendices A and B attached hereto are source code listings, in the C language, of computer programs implementing the various aspects of the invention described herein. They are part of a hidden surface algorithm. Appendix A is a general program that carries out the spatial sampling techniques of FIGS. 6 and 7 herein, one of which is optionally selected, temporal sampling of FIGS. 14 and 15 herein, depth of field of FIG. 18 herein, and secondary rays of FIGS. 19-22 for shadowing and reflection in a special image case. The resultant images of FIGS. 3, 5 and 7 of the above-referenced published paper, were made on a Cray computer with the source code listing of Appendix A.

Appendix B is a program that implements all of the aspects of the present invention for spherical objects and resulted in the images of FIGS. 4, 6 and 8 of the above-referenced published paper.

These computer program contain material in which a claim of copyright is made by Lucasfilm, Ltd., the assignee hereof. This assignee has no objection to the duplication of Appendices A and B by photocopying and the like but reserves all other copyright rights therein.

Although the various aspects of the present invention have been described with respect to various preferred embodiments thereof, it will be understood that the invention is entitled to protection within the full scope of the appended claims.

APPENDIX A

Copyright © 1985 Lucasfilm Ltd.

ssvis.c ssvis.c

```
#ifndef lint
static char sccsid[] = "@(#)ssvis.c 1.40 (Lucasfilm) 5/20/85";
endif include <ssvis.h>
include <ctype.h>
#include <stdio.h>
include <constants.h> static int VisNewGrid(), VisEndBucket(), VisNewFrame(), VisEndFrame(), VisParam(), VisCamera(), VisWrite(NewGrid);
static int CSGNewTree(), CSGResolve();                                                                CSGNewTree static struct vis_procs VisProcs = { VisNewGrid, VisEndBucket, VisNewFrame, VisEndFrame, VisParam, CSGNewTree, V struct bbox {struct xyz min, max;} ;
struct visiblepoint {
    struct visiblepoint    *next ;
    struct xyz             v[4] ;
```

```
    float         minz, maxz ;
    struct color  color ;
    struct color  trans ;
    struct visflags flag ;
    float         glassbackopacity ;
#if CSG
    short         csgtree ;
    short         csgnode ;
#endif CSG
} ;

float drand() ;                                                             drand
static float Pi;
static int Minx, Maxx, Miny, Maxy ;
static int Border=1 ;
static float Hither, Yon ;
static int XPerBucket, YPerBucket, PixelsPerBucket, FiltersPerBucket ;
static int SamplesPerBucket ;
static int MaxSamplesPerBucket ;
static int BucketsAcrossScreen ;
static struct pixelrgba *Pixel ;
static struct visiblepoint **Point, *VisFreeList=0 ;
static int NVis=0, NVisInUse=0, NVisMaxUsed=0 ;
static int VisMallocSize=(16*1024-64) ;                                     VisMallocSize
static int Hit, Miss, Lerp ;

static float   FocalLength  = 0 ;
static float   FStop        = 0 ;
static float   FocalDistance = 0 ;
float Dofx_a, Dofx_b, Dofy_a, Dofy_b ;
int PinHoleCamera=1 ;

static float   FilterWidth = 2.0 ;
static int     FilterType  = 1 ;
static int     BoxFilterFlag = 0 ;
static float boxfilter(x,y) float x,y;                                      boxfilter
    { return (x>FilterWidth||y>FilterWidth) ? 0 : 1; }
static float gaussianfilter(x,y) float x,y ;                                gaussianfilter
{   float w,d ;
    d=x*x+y*y;
    w=FilterWidth*FilterWidth/4.;
    return (d>w) ? 0 : exp(-d) - exp(-w);
}
static float sinc(r) float r;                                               sinc
    { return (r<.001&&r>-.001) ? cos(2*r)/1 : sin(2*r)/r; }
static float sincfilter(x,y) float x,y ;                                    sincfilter
    { return sinc(x)*sinc(y); }
static float bessel(r) float r;                                             bessel
    { return (r<.001&&r>-.001) ? 1 : j1(2*r)/r; }
static float besselfilter(x,y) float x,y ;                                  besselfilter
{   float r ;
    r = sqrt(x*x+y*y);
    return bessel(r);
}
static float bartlettfilter(x,y) float x,y ;                                bartlettfilter
{   float ax,ay,w;
    ax = (x<0) ? -x : x;
    ay = (y<0) ? -y : y;
    w  = FilterWidth;
    return (w<ax||w<ay) ? 0 : (w-ax)*(w-ay);
}
#define FILTERNAME 80
#define NFILTERS 5
static char    FilterName[NFILTERS][FILTERNAME] =
               {"box", "Gaussian", "sinc", "Bartlett",
               "Bessel") ;
static float   (*FilterRoutine[NFILTERS])() =                               float
               {boxfilter, gaussianfilter, sincfilter, bartlettfilter,
               besselfilter};

#define NJITTER 512
static int JitterFlag=1;
static float XJitter[NJITTER], YJitter[NJITTER], TJitter[NJITTER];
static float LXJitter[NJITTER], LYJitter[NJITTER] ;
```

```
static struct xy *Location ;
static float *Filter ;
static struct xy *Lens ;
static float MinXJitter=0, MaxXJitter ;
static float MinYJitter=0, MaxYJitter ;
static int NS ;
static int NxGrid=4, NyGrid=4 ;

static struct xy Lens16[16] = {
    0.312500,  0.000000,
   -0.312500,  0.000000,
    0.750000,  0.000000,
   -0.750000,  0.000000,
    0.000000,  0.312500,
    0.000000, -0.312500,
    0.000000,  0.750000,
    0.000000, -0.750000,
    0.625000,  0.375000,
    0.375000,  0.625000,
   -0.625000,  0.375000,
   -0.375000,  0.625000,
    0.625000, -0.375000,
    0.375000, -0.625000,
   -0.625000, -0.375000,
   -0.375000, -0.625000 } ;

struct vis_procs *VisLoad() {
    Pi = 4*atan(1.0);
    return(&VisProcs);
} static int VisCamera(focallength,fstop,focaldistance)
    float focallength, fstop, focaldistance ;
{
    PinHoleCamera = (focallength==0.0) ;
    if (PinHoleCamera) return ;

if (focallength<0.0 || fstop<=0.0 || focaldistance<=0.0) {
        fprintf (stderr, "Invalid arguments to visible surface camera routine:\n") ;
        fprintf (stderr, "\tfocal length    %f\n", focallength) ;
        fprintf (stderr, "\tf stop          %f\n", fstop) ;
        fprintf (stderr, "\tfocal distance %f\n", focaldistance) ;
    }
    FocalLength = focallength ;
    FStop = fstop ;
    FocalDistance = focaldistance ;
} static int VisCameraSetup()
{
    float lensradius ;
    static struct xyz Aeye={0,0,1}, Beye={1,1,1} ;
    struct xy Ascreen, Bscreen ;

/* The perspective transformation from eye space to screen space assumes
 * a pinhole camera located at the origin in eye space, and transforms
 * each point (Xe,Ye,Ze) in eye space to a point (Xs,Ys,Zs) in screen
 * space. For depth of field, however, different sample points assume
 * pinhole cameras located at different points on the lens. A point
 * that is at (Xe,Ye,Ze) in eye space of the center of the lens is at
 * (Xcl,Ycl,Ze) in the eye space of the point (lensx,lensy,0) on the
 * lens, where
 * Xcl-Xe = lensx * ( 1 - Ze/focaldistance )
 * Ycl-Ye = lensy * ( 1 - Ze/focaldistance )
 * The values of lensx and lensy that we use are express as a fraction
 * of the effective lens radius, so that our formulas are actually
 * Xcl-Xe = lensx * lensradius * (1 - Ze/focaldistance)
 * Ycl-Ye = lensy * lensradius * (1 - Ze/focaldistance)
 * where
 * lensradius = 0.5 * focallength / fstop
 * We know that the perspective matrix is of the form
 * a 0 0 0
 * 0 b 0 0
 * c d e f
```

```
 * g h i 0
 * so that
 * Xs = (a*Xe + c*Ze + g ) / (f*Ze)
 * Ys = (b*Xe + d*Ze + h ) / (f*Ze)
 * and
 * Xsl = (a*Xel + c*Ze + g ) / (f*Ze)
 * Ysl = (b*Xel + d*Ze + h ) / (f*Ze)
 * giving us
 * Xsl-Xs = (Xel-Xe) * a/(f*Ze)
 *        = lensx * lensradius * (a/f) * (1/Ze - 1/focaldistance)
 *        = lensx * (Dofx_a/Ze + Dofx_b)
 * Ysl-Ys = (Yel-Ye) * b/(f*Ze)
 *        = lensy * lensradius * (b/f) * (1/Ze - 1/focaldistance)
 *        = lensy * (Dofy_a/Ze + Dofy_b)
 * These formulas are the ones we use to transform screen space points
 * to account for different lens locations.
 * We can calculate the key variables in these equations by finding the
 * the screen space coordinates of the points A=(0,0,1) and B=(1,1,1):
 * XsA = (a*0 + c*1 + g) / (f*1)
 *     = (c+g)/f
 *     XsB = (a+c+g)/f
 *     XsB-XsA = a/f
 *     YsB-YsA = d/f
 * and it follows that
 * Dofx_a = (XsB-XsA) * lensradius
 * Dofy_a = (YsB-YsA) * lensradius
 * Dofx_b = -Dofx_a/focaldistance
 * Dofy_b = -Dofy_a/focaldistance
 */
    if (PinHoleCamera) return ;

lensradius = 0.5 * FocalLength / FStop ;
    EyeToScreenXY(&Aeye,&Ascreen) ;
    EyeToScreenXY(&Beye,&Bscreen) ;
    Dofx_a = lensradius * (Bscreen.x - Ascreen.x) ;
    Dofy_a = lensradius * (Bscreen.y - Ascreen.y) ;
    Dofx_b = -Dofx_a / FocalDistance ;
    Dofy_b = -Dofy_a / FocalDistance ;
} static int VisEndBucket(xb,yb)
    int xb,yb ;
{
    float *jx, *jy, *jt, *jlx, *jly ;
    int x,y ;
    register int s, i ;
    register struct mpoly *mp ;
    struct mpoly *MpGetBucket() ;

int left, right, top, bottom ;
    float alpha, aalpha;
#if ALPHABETA
    float beta0, beta1, beta2, beta3, oma ;
#endif
    struct bbox bound(), box, speedbox ;
    struct bbox boundspeed() ;
    int xmin, xmax, ymin, ymax ;
    static struct xyz vertex[1], v[4] ;
    int asample, pixel ;
    float locx, locy, dx, dy, lx, ly, rx, ry ;
    float ax, ay, bx, by, lensx, lensy ;

left   = Minx + xb*XPerBucket ;
    top    = Miny + yb*YPerBucket ;
    right  = left + XPerBucket - 1 ;
    bottom = top  + YPerBucket - 1 ;

mp=MpGetBucket(xb,yb);
    if (!mp) goto emptybucket;

bzero ((char *)Pixel, FiltersPerBucket*sizeof(struct pixelrgba)) ;
    CalcSamplesPerBucket(mp) ;
```

```
        bzero ((char *)Point, SamplesPerBucket*sizeof(struct visiblepoint *));
        jx = &XJitter[(int)(23*drand())] ;
        jy = &YJitter[(int)(23*drand())] ;
        jt = &TJitter[(int)(23*drand())] ;
        jlx = &LXJitter[(int)(23*drand())] ;
        jly = &LYJitter[(int)(23*drand())] ;
        for (; mp; mp=mp->next) {
            bcopy ((char *)mp->v,(char *)vertex,sizeof(vertex)) ;
            vertex[0].x -= left ;
            vertex[1].x -= left ;
            vertex[2].x -= left ;
            vertex[3].x -= left ;
            vertex[0].y -= top ;
            vertex[1].y -= top ;
            vertex[2].y -= top ;
            vertex[3].y -= top ;
            box = bound(vertex) ;
            mp->min.z = box.min.z ;
            mp->max.z = box.max.z ;
#if MOTIONBLUR && IGLOSS
            if (mp->flag.moving) {
                speedbox = bound(mp->speed) ;
                if (speedbox.min.z<0) box.min.z += speedbox.min.z ;
                if (speedbox.max.z>0) box.max.z += speedbox.max.z ;
                mp->min.z = box.min.z ;
                mp->max.z = box.max.z ;
#if DEPTHOFFIELD
                if (!PinHoleCamera)
                    bounddof (&box) ;
#endif DEPTHOFFIELD
            speedbox.min.x /= NS ;
            speedbox.max.x /= NS ;
            speedbox.min.y /= NS ;
            speedbox.max.y /= NS ;
            if (speedbox.min.x<0) box.min.x += speedbox.min.x ;
            if (speedbox.max.x>0) box.max.x += speedbox.max.x ;
            if (speedbox.min.y<0) box.min.y += speedbox.min.y ;
            if (speedbox.max.y>0) box.max.y += speedbox.max.y ;
            for (s=0; s<NS; s++) {
                salpha = s/(float)NS ;
                locx = Location[s].x ;
                locy = Location[s].y ;
                lensx = Lens[s].x - .5/NS ;
                lensy = Lens[s].y - .5/NS ;
                xmin = box.min.x - locx - MaxXJitter ;
                ymin = box.min.y - locy - MaxYJitter ;
                xmax = box.max.x - locx /* + MinXJitter */ ;
                ymax = box.max.y - locy /* + MinYJitter */ ;
                if (xmin<0) xmin=0 ;
                if (xmax>=XPerBucket) xmax=XPerBucket-1 ;
                if (ymin<0) ymin=0 ;
                if (ymax>=YPerBucket) ymax=YPerBucket-1 ;
                for (y=ymin, dy=locy+ymin; y<=ymax; dy++, y++) {
                    pixel = y*XPerBucket + xmin ;
                    asample = pixel*NS+s ;
                    i = 7*s + 2*pixel ;
                    for (x=xmin, dx=locx+xmin; x<=xmax; asample+=NS, i+=2, dx++, x++) {
                        alpha = salpha + jt[i+2] ;
#if ALPHABETA
                        oma = 1 - alpha ;
                        beta0 = alpha / (alpha + oma*mp->abratio[0]) ;
                        beta1 = alpha / (alpha + oma*mp->abratio[1]) ;
                        beta2 = alpha / (alpha + oma*mp->abratio[2]) ;
                        beta3 = alpha / (alpha + oma*mp->abratio[3]) ;
#else
#define beta0 alpha
#define beta1 alpha
#define beta2 alpha
#define beta3 alpha
#endif
                        v[0].x = vertex[0].x + beta0*mp->speed[0].x ;
                        v[1].x = vertex[1].x + beta1*mp->speed[1].x ;
                        v[2].x = vertex[2].x + beta2*mp->speed[2].x ;
                        v[3].x = vertex[3].x + beta3*mp->speed[3].x ;
                        v[0].y = vertex[0].y + beta0*mp->speed[0].y ;
                        v[1].y = vertex[1].y + beta1*mp->speed[1].y ;
```

...VieEndBucket

```
                v[2].y = vertex[2].y + beta2*mp->speed[2].y ;
                v[3].y = vertex[3].y + beta3*mp->speed[3].y ;
                v[0].x = vertex[0].x + beta0*mp->speed[0].x ;
                v[1].x = vertex[1].x + beta1*mp->speed[1].x ;
                v[2].x = vertex[2].x + beta2*mp->speed[2].x ;
                v[3].x = vertex[3].x + beta3*mp->speed[3].x ;
#if DEPTHOFFIELD
                if (!PinHoleCamera) {
                    lx = lensx + jlx[i+3] ;
                    ly = lensy + jly[i+4] ;
                    ax = lx * Dofx_a ;
                    ay = ly * Dofy_a ;
                    bx = lx * Dofx_b ;
                    by = ly * Dofy_b ;
                    v[0].x += ax / v[0].z ;
                    v[1].x += ax / v[1].z ;
                    v[2].x += ax / v[2].z ;
                    v[3].x += ax / v[3].z ;
                    v[0].y += ay / v[0].z ;
                    v[1].y += ay / v[1].z ;
                    v[2].y += ay / v[2].z ;
                    v[3].y += ay / v[3].z ;
                    rx = dx + jx[i] - bx ;
                    ry = dy + jy[i+1] - by ;
                }
                else
#endif
                {
                    rx = dx + jx[i] ;
                    ry = dy + jy[i+1] ;
                }
                v[0].x -= rx ; v[0].y -= ry ;
                v[1].x -= rx ; v[1].y -= ry ;
                v[2].x -= rx ; v[2].y -= ry ;
                v[3].x -= rx ; v[3].y -= ry ;
                sample(asample,mp,v) ;
            }
        }
        box.min.x += speedbox.min.x ;
        box.max.x += speedbox.max.x ;
        box.min.y += speedbox.min.y ;
        box.max.y += speedbox.max.y ;
    }
}
else
#endif
{
#if DEPTHOFFIELD
    if (!PinHoleCamera)
        bounddof (&box) ;
#if GLOSS
    float d ;
    d = sqrt (mp->speed[0].x*mp->speed[0].x +
              mp->speed[0].y*mp->speed[0].y +
              mp->speed[0].z*mp->speed[0].z) ;
#endif
    v[0].z = vertex[0].z ;
    v[1].z = vertex[1].z ;
    v[2].z = vertex[2].z ;
    v[3].z = vertex[3].z ;
    for (s=0; s<NS; s++) {
        locx = Location[s].x ;
        locy = Location[s].y ;
        lensx = Lens[s].x - .5/NS ;
        lensy = Lens[s].y - .5/NS ;
        xmin = box.min.x - locx - MaxXJitter ;
        ymin = box.min.y - locy - MaxYJitter ;
        xmax = box.max.x - locx /* + MinXJitter */ ;
        ymax = box.max.y - locy /* + MinYJitter */ ;
        if (xmin<0) xmin=0 ;
        if (xmax>=XPerBucket) xmax=XPerBucket-1 ;
        if (ymin<0) ymin=0 ;
        if (ymax>=YPerBucket) ymax=YPerBucket-1 ;
        for (y=ymin, dy=locy+ymin; y<=ymax; dy++, y++) {
            pixel = y*XPerBucket + xmin ;
            asample = pixel*NS+s ;
```

...VisEndBucket

...VisEndBucket

```
                        i = 7*s + 2*pixel ;
                        for (x=xmin, dx=locx+xmin; x<=xmax; asample+=NS, i+=2, dx++, x++) {
                            lx = knsx + jx[i+3] ;
                            ly = knsy + jy[i+4] ;
#if GLOSS
                            lx *= d ;
                            ly *= d ;
#endif
                            ax = lx * Dofx_a ;
                            ay = ly * Dofy_a ;
                            bx = lx * Dofx_b ;
                            by = ly * Dofy_b ;
                            rx = dx + jx[i] - bx ;
                            ry = dy + jy[i+1] - by ;
                            v[0].x = vertex[0].x - rx + ax/vertex[0].z ;
                            v[1].x = vertex[1].x - rx + ax/vertex[1].z ;
                            v[2].x = vertex[2].x - rx + ax/vertex[2].z ;
                            v[3].x = vertex[3].x - rx + ax/vertex[3].z ;
                            v[0].y = vertex[0].y - ry + ay/vertex[0].z ;
                            v[1].y = vertex[1].y - ry + ay/vertex[1].z ;
                            v[2].y = vertex[2].y - ry + ay/vertex[2].z ;
                            v[3].y = vertex[3].y - ry + ay/vertex[3].z ;
                            sample(asample,mp,v) ;
                        }
                    }
                }
            }
        else
#endif
            {
                v[0].z = vertex[0].z ;
                v[1].z = vertex[1].z ;
                v[2].z = vertex[2].z ;
                v[3].z = vertex[3].z ;
                for (s=0; s<NS; s++) {
                    locx = Location[s].x ;
                    locy = Location[s].y ;
                    xmin = box.min.x - locx - MaxXJitter ;
                    ymin = box.min.y - locy - MaxYJitter ;
                    xmax = box.max.x - locx /* + MinXJitter */ ;
                    ymax = box.max.y - locy /* + MinYJitter */ ;
                    if (xmin<0) xmin=0 ;
                    if (xmax>=XPerBucket) xmax=XPerBucket-1 ;
                    if (ymin<0) ymin=0 ;
                    if (ymax>=YPerBucket) ymax=YPerBucket-1 ;
                    for (y=ymin, dy=locy+ymin; y<=ymax; dy++, y++) {        /* VirEndBucket */
                        pixel = y*XPerBucket + xmin ;
                        asample = pixel*NS+s ;
                        i = 7*s + 2*pixel ;
                        for (x=xmin, dx=locx+xmin; x<=xmax; asample+=NS, i+=2, dx++, x++) {
                            rx = dx + jx[i] ;
                            ry = dy + jy[i+1] ;
                            v[0].x = vertex[0].x - rx ;
                            v[1].x = vertex[1].x - rx ;
                            v[2].x = vertex[2].x - rx ;
                            v[3].x = vertex[3].x - rx ;
                            v[0].y = vertex[0].y - ry ;
                            v[1].y = vertex[1].y - ry ;
                            v[2].y = vertex[2].y - ry ;
                            v[3].y = vertex[3].y - ry ;
                            sample(asample,mp,v) ;
                        }
                    }
                }
            }
    }

CSGResolve() ;
    filter() ;
    freepoints() ;

DisplayWindow (Pixel, left-Border, right+Border, top-Border, bottom+Border) ;

MpEmptyBucket(xb,yb) ;
    return 1 ;
```

```
emptybucket:
    DisplayWindow ((struct pixelrgba *)0, left-Border, right+Border, top-Border, bottom+Border) ;
    MpEmptyBucket(xb,yb) ;
    return 0 ;
} static int VisEndFrame()                                                                    VisEndF..
{
    MpBucketEndFrame() ;
    DisplayEndFrame() ;
} static int VisFilter(type,width)                                                            Vi-I...
    char *type;
    float width ;
{
    int i ;
    if (FilterWidth<=0.) goto Error;
    for(i=0;i<NFILTERS;i++) {
        if (!strcmp(type,FilterName[i])) {
            FilterType = i ;
            FilterWidth = width;
            BoxFilterFlag = (width==1.0 && !strcmp(type,"box"));                            ...VisFilter
            return;
        }
    }
    fprintf (stderr, "The stochastic hider only has the following filters:\n") ;
    for(i=0;i<NFILTERS;i++)
        fprintf (stderr, "%s ",FilterName[i]) ;
    fprintf (stderr, "\n") ;
    return;
Error:
    fprintf (stderr, "Filter width must be >0\n") ;
} static int VisNewFrame (minx,maxx,miny,maxy,xper,yper,sideways,hither,yon)                  VisNewFrame
    float hither, yon ;
{
    int ax ;

Hither = hither ;
    Yon = yon ;
    Border = FilterWidth/2. + 0.499 ;
    XPerBucket = xper ;
    YPerBucket = yper ;
    PixelsPerBucket = XPerBucket * YPerBucket ;
    FiltersPerBucket = (XPerBucket+2*Border) * (YPerBucket+2*Border) ;
    tablesinit(NxGrid,NyGrid);
    MaxSamplesPerBucket = PixelsPerBucket * NS ;
    Minx = minx - Border ;
    Miny = miny - Border ;
    Maxx = maxx + Border ;
    Maxy = maxy + Border ;
    ax = Maxx - Minx + 1 ;
    BucketsAcrossScreen = (ax+XPerBucket-1) / XPerBucket ;
    if (Point) {
        free((char *)Point) ;
        free((char *)Pixel) ;
    }
    Point = (struct visiblepoint **) malloc ((unsigned)(MaxSamplesPerBucket * sizeof(struct visiblepoint *) )) ;
    Pixel = (struct pixelrgba *) malloc ((unsigned)(FiltersPerBucket * sizeof(struct pixelrgba) )) ;

VisCameraSetup() ;
    MpBucketNewFrame (Minx, Maxx, Miny, Maxy, XPerBucket, YPerBucket, sideways, hither, yon) ;
    DisplayNewFrame (minx, maxx, miny, maxy, Border, XPerBucket, YPerBucket, sideways) ;

Hit = 0 ;
    Lerp = 0 ;
    Miss = 0 ;

return Border ;
} static int VisNewGrid(g)                                                                    VisNewGrid
```

```c
    struct grid *g;
{
    MpBucketNewGrid(g) ;
}                                                                               _VisNewGrid static int VisParam(ac,av) char **av; {                                         VisParam
    int x,y;
    while(ac>0) {
        if (!strcmp(*av,"grid")) {
            if (ac==1 || !isdigit(*av[1])) {
                NxGrid=4;
                NyGrid=4;
                av++;
                ac--;
            }
            else if (ac>=3) {
                x=atoi(av[1]) ;
                y=atoi(av[2]) ;
                if (x<=0 || y<=0) goto Error;
                NxGrid = x;
                NyGrid = y;
                av+=3;
                ac-=3;
            }
            else goto Error;
        }
        else if (!strcmp(*av,"jitter")) {
            if (ac>=1) {
                JitterFlag = OnOff(av[1]) ;
                av+=2;
                ac-=2;
            }
            else
                JitterFlag = 1 ;
                av++;
                ac--;
        }
        else goto Error;
    }
    return ;
Error:
    fprintf (stderr,"The stochastic hider can take these parameters:\n");
    fprintf (stderr,"\tgrid %%d %%d\n");
    fprintf (stderr,"\tjitter on/off\n");
} static int VisPrint(s)                                                          VisPrint
    char *s ;
{
    if (s && (!strcmp(s,"stat"))) {
        register struct visiblepoint *vp ;
        register int n ;
    MpPrintStat() ;                                                             _VisPrint
    for (n=0, vp=VisFreeList; vp; vp=vp->next, n++) ;
    printf ("        Visiblepoints: %4d allocated", NVis) ;
    printf (" %4d kb", sizeof(struct visiblepoint)*NVis/1024) ;
    printf (" %4d used", NVisMaxUsed) ;
    printf (" %4d in use", NVisInUse) ;
    printf (" %4d free\n", n) ;
    n = Hit+Miss ;
    if (n==0) n=1 ;
        printf ("        Hider samples: %5.2f%% (%d hits and %d misses)\n",
            100.*Hit/(float)n, Hit, Miss) ;
    if (Hit)
        printf ("        Hider s lerps: %5.2f%% (%d lerps out of %d hits)\n",
            100.*Lerp/(float)Hit, Lerp, Hit) ;
}
else {
    printf ("        Hider:        stochastic sampler");
    printf (" (%d by %d samples per pixel)", NxGrid, NyGrid) ;
    printf (" jitter %s\n", JitterFlag?"on":"off" ) ;
    printf ("        Filter:       %s, %f pixels wide\n", FilterName[FilterType], FilterWidth) ;
    if (PinHoleCamera)
        printf ("        Camera:       pinhole\n") ;
```

```
        else {
            printf ("          Camera:            focal length    %f\n",FocalLength) ;
            printf ("                             f stop          %f\n",FStop) ;
            printf ("                             focal distance  %f\n",FocalDistance) ;
        }
    }
} static struct bbox bound(v)                                                              bound
    struct xyz v[4] ;
{
    struct bbox b ;

if (v[0].x < v[1].x) {
        if (v[2].x < v[3].x) {
            b.min.x = (v[0].x < v[2].x) ? v[0].x : v[2].x ;
            b.max.x = (v[1].x > v[3].x) ? v[1].x : v[3].x ;
        }
        else {
            b.min.x = (v[0].x < v[3].x) ? v[0].x : v[3].x ;
            b.max.x = (v[1].x > v[2].x) ? v[1].x : v[2].x ;
        }
    }
    else {
        if (v[2].x < v[3].x) {
            b.min.x = (v[1].x < v[2].x) ? v[1].x : v[2].x ;
            b.max.x = (v[0].x > v[3].x) ? v[0].x : v[3].x ;
        }
        else {
            b.min.x = (v[1].x < v[3].x) ? v[1].x : v[3].x ;
            b.max.x = (v[0].x > v[2].x) ? v[0].x : v[2].x ;
        }
    }
    if (v[0].y < v[1].y) {                                                               ...bound
        if (v[2].y < v[3].y) {
            b.min.y = (v[0].y < v[2].y) ? v[0].y : v[2].y ;
            b.max.y = (v[1].y > v[3].y) ? v[1].y : v[3].y ;
        }
        else {
            b.min.y = (v[0].y < v[3].y) ? v[0].y : v[3].y ;
            b.max.y = (v[1].y > v[2].y) ? v[1].y : v[2].y ;
        }
    }
    else {
        if (v[2].y < v[3].y) {
            b.min.y = (v[1].y < v[2].y) ? v[1].y : v[2].y ;
            b.max.y = (v[0].y > v[3].y) ? v[0].y : v[3].y ;
        }
        else {
            b.min.y = (v[1].y < v[3].y) ? v[1].y : v[3].y ;
            b.max.y = (v[0].y > v[2].y) ? v[0].y : v[2].y ;
        }
    }
    if (v[0].z < v[1].z) {
        if (v[2].z < v[3].z) {
            b.min.z = (v[0].z < v[2].z) ? v[0].z : v[2].z ;
            b.max.z = (v[1].z > v[3].z) ? v[1].z : v[3].z ;
        }
        else {
            b.min.z = (v[0].z < v[3].z) ? v[0].z : v[3].z ;
            b.max.z = (v[1].z > v[2].z) ? v[1].z : v[2].z ;
        }
    }
    else {
        if (v[2].z < v[3].z) {
            b.min.z = (v[1].z < v[2].z) ? v[1].z : v[2].z ;
            b.max.z = (v[0].z > v[3].z) ? v[0].z : v[3].z ;
        }
        else {
            b.min.z = (v[1].z < v[3].z) ? v[1].z : v[3].z ;
            b.max.z = (v[0].z > v[2].z) ? v[0].z : v[2].z ;
        }
    }
    return b ;
}
```

```
#if DEPTHOFFIELD
bounddof(b)                                                                    bounddof
    struct bbox *b ;
{
    float b1, b2, zmin, zmax ;

/*if (PinHoleCamera) return ;*/ zmin = b->min.z ;
    zmax = b->max.z ;

if (zmin<Hither) zmin = Hither ;                                           ...bounddof
    if (zmax>Yon)    zmax = Yon ;

b1 = Dofx_a/zmin + Dofx_b ;
    b2 = Dofx_a/zmax + Dofx_b ;
    if (b1<0) b1 = -b1 ;
    if (b2<0) b2 = -b2 ;
    if (b2>b1) b1=b2 ;
    b->min.x -= b1 ;
    b->max.x += b1 ;

b1 = Dofy_a/zmin + Dofy_b ;
    b2 = Dofy_a/zmax + Dofy_b ;
    if (b1<0) b1 = -b1 ;
    if (b2<0) b2 = -b2 ;
    if (b2>b1) b1=b2 ;
    b->min.y -= b1 ;
    b->max.y += b1 ;
}
endif DEPTHOFFIELD static CalcSamplesPerBucket(mp) register struct mpoly *mp ; { }                CalcSamplesPerBucket static applyboxfilter()                                                        applyboxfilter
{
    int x, y ;
    register int s ;
    register struct pixelrgba *p ;
    register struct visiblepoint **vpp, *vp ;
    register float oneoverns ;
    int bb ;

bb = 2*Border ;
    oneoverns = 1./(float)NS ;
    vpp = Point ;
    vp = *vpp++ ;
    p = Pixel + Border*(XPerBucket+bb) + Border ;
    for (y=0; ++y<=YPerBucket; p+=bb) {
        for (x=0; ++x<=XPerBucket; p++) {
            for (s=0; ++s<=NS; vp=(*vpp++)) {
                if (vp && !vp->flag.matte) {
                    p->r += oneoverns * vp->color.r ;
                    p->g += oneoverns * vp->color.g ;
                    p->b += oneoverns * vp->color.b ;
                    p->a += (vp->flag.opaque) ? oneoverns : oneoverns * (1.-
                        (vp->trans.r+vp->trans.g+vp->trans.b)*(1./3.)) ;
                }
            }
        }
    }
} static filter()                                                                filter
{
    int x, y ;
    register int j, i ;
    register float *f;
    register struct pixelrgba *p ;
    register struct visiblepoint *vp ;
    register int s ;
    struct visiblepoint **vpp ;
    float alpha ;
    struct pixelrgba *ploop, *pp ;
```

```
        int fskip, pskip, pback ;
        int width, bb ;

if (BoxFilterFlag) {
            applyboxfilter();
            return;
        }
/* Set up increments so that in the inner loop:
 *      f = &(Filter[s*FilterWidth*FilterWidth+j*FilterWidth+i]) ;
 *      p = Pixel + (y+j)*(XPerBucket+2*Border) + x + i ;
 */
        bb = Border+Border ;
        width = 1 + bb ;
        fskip = width*width ;
        pskip = sizeof(*p) * (XPerBucket+bb-width) ;
        pback = sizeof(*p) * (width*(XPerBucket+bb)) ;
        for (y=0, p=Pixel, vpp=Point, vp=(*vpp++); ++y<=YPerBucket; p+=bb) {
            for (x=0; ++x<=XPerBucket; p++) {
                for (s=0, f=Filter; ++s<=NS; vp=(*vpp++)) {
                    if (vp && !vp->flag.matte) {
                        if (vp->flag.opaque) {
                            for (j=0; ++j<=width; ) {
                                for (i=0; ++i<=width; ) {
                                    p->r += *f * vp->color.r ;
                                    p->g += *f * vp->color.g ;
                                    p->b += *f * vp->color.b ;
                                    p++->a += *f++ ;
                                }
                                p = (struct pixelrgba *)((char *)p+pskip) ;
                            }
                            p = (struct pixelrgba *)((char *)p-pback) ;
                        }
                        else {
                            alpha = 1. - (1./3.) *
                                (vp->trans.r+vp->trans.g+vp->trans.b);
                            for (j=0; ++j<=width; ) {
                                for (i=0; ++i<=width; ) {
                                    p->r += *f * vp->color.r ;
                                    p->g += *f * vp->color.g ;
                                    p->b += *f * vp->color.b ;
                                    p++->a += *f++ *alpha ;
                                }
                                p = (struct pixelrgba *)((char *)p+pskip) ;
                            }
                            p = (struct pixelrgba *)((char *)p-pback) ;
                        }
                    }
                    else {
                        f += fskip ;
                    }
                }
            }
        }
} float lerpz(v)
    register struct xyz v[4] ;
{
/*
 * Interpolate z using Shepard's method. Use the Manhattan distance
 * to each vertex as an approximation to the actual distance.
 */
    float alpha[4], dist[4], d01, d23 ;
    float z ;
    dist[0]  = (v[0].x>0.) ? v[0].x : -v[0].x ;
    dist[0] += (v[0].y>0.) ? v[0].y : -v[0].y ;
    dist[1]  = (v[1].x>0.) ? v[1].x : -v[1].x ;
    dist[1] += (v[1].y>0.) ? v[1].y : -v[1].y ;
    dist[2]  = (v[2].x>0.) ? v[2].x : -v[2].x ;
    dist[2] += (v[2].y>0.) ? v[2].y : -v[2].y ;
    dist[3]  = (v[3].x>0.) ? v[3].x : -v[3].x ;
    dist[3] += (v[3].y>0.) ? v[3].y : -v[3].y ;
    d01 = dist[0] * dist[1] ;
    d23 = dist[2] * dist[3] ;
```

```
        alpha[0] = d23 * dist[1] ;
        alpha[1] = d23 * dist[0] ;
        alpha[2] = d01 * dist[3] ;
        alpha[3] = d01 * dist[2] ;
        z  = alpha[0] * v[0].z ;
        z += alpha[1] * v[1].z ;
        z += alpha[2] * v[2].z ;
        z += alpha[3] * v[3].z ;
        z /= alpha[0] + alpha[1] + alpha[2] + alpha[3] ;
        Lerp++ ;
        return z ;
} if GOURAUD
gouraud(v,mp,vp)                                                              gouraud
    register struct xyz v[4] ;
    register struct mpoly *mp ;
    register struct visiblepoint *vp ;
{
/*
 * Interpolate using Shepard's method. Use the Manhattan distance
 * to each vertex as an approximation to the actual distance.
 */
    float alpha[4], sum, alphasum, dist[4], d01, d23 ;                        ...gouraud
    dist[0]  = (v[0].x>0.) ? v[0].x : -v[0].x ;
    dist[0] += (v[0].y>0.) ? v[0].y : -v[0].y ;
    dist[1]  = (v[1].x>0.) ? v[1].x : -v[1].x ;
    dist[1] += (v[1].y>0.) ? v[1].y : -v[1].y ;
    dist[2]  = (v[2].x>0.) ? v[2].x : -v[2].x ;
    dist[2] += (v[2].y>0.) ? v[2].y : -v[2].y ;
    dist[3]  = (v[3].x>0.) ? v[3].x : -v[3].x ;
    dist[3] += (v[3].y>0.) ? v[3].y : -v[3].y ;
    d01 = dist[0] * dist[1] ;
    d23 = dist[2] * dist[3] ;
    alpha[0] = d23 * dist[1] ;
    alpha[1] = d23 * dist[0] ;
    alpha[2] = d01 * dist[3] ;
    alpha[3] = d01 * dist[2] ;
    alphasum = alpha[0] + alpha[1] + alpha[2] + alpha[3] ;
    sum  = alpha[0] * mp->color[0].r ;
    sum += alpha[1] * mp->color[1].r ;
    sum += alpha[2] * mp->color[2].r ;
    sum += alpha[3] * mp->color[3].r ;
    vp->color.r = sum/alphasum ;
    sum  = alpha[0] * mp->color[0].g ;
    sum += alpha[1] * mp->color[1].g ;
    sum += alpha[2] * mp->color[2].g ;
    sum += alpha[3] * mp->color[3].g ;
    vp->color.g = sum/alphasum ;
    sum  = alpha[0] * mp->color[0].b ;
    sum += alpha[1] * mp->color[1].b ;
    sum += alpha[2] * mp->color[2].b ;
    sum += alpha[3] * mp->color[3].b ;
    vp->color.b = sum/alphasum ;
    sum  = alpha[0] * mp->trans[0].r ;
    sum += alpha[1] * mp->trans[1].r ;
    sum += alpha[2] * mp->trans[2].r ;
    sum += alpha[3] * mp->trans[3].r ;
    vp->trans.r = sum/alphasum ;
    sum  = alpha[0] * mp->trans[0].g ;
    sum += alpha[1] * mp->trans[1].g ;
    sum += alpha[2] * mp->trans[2].g ;
    sum += alpha[3] * mp->trans[3].g ;
    vp->trans.g = sum/alphasum ;
    sum  = alpha[0] * mp->trans[0].b ;
    sum += alpha[1] * mp->trans[1].b ;
    sum += alpha[2] * mp->trans[2].b ;
    sum += alpha[3] * mp->trans[3].b ;
    vp->trans.b = sum/alphasum ;
}
endif GOURAUD static sample (nsample, mp, v)                                                sample
    int nsample ;
```

```
    register struct mpoly *mp ;
    register struct xyz v[4] ;
{
    register struct visiblepoint *vp ;                                              ...sample
    register int inside ;
    float z ;

/* If the micropolygon crosses the hither or yon plane during this
 * frame, see if it crosses it for this sample
 */
#if MOTIONBLUR && !GLOSS
    if (mp->flag.hitheryoncrossing && mp->flag.moving) {
        float zmin, zmax ;
        if (v[0].z < v[1].z) {
            if (v[2].z < v[3].z) {
                zmin = (v[0].z < v[2].z) ? v[0].z : v[2].z ;
                zmax = (v[1].z > v[3].z) ? v[1].z : v[3].z ;
            }
            else {
                zmin = (v[0].z < v[3].z) ? v[0].z : v[3].z ;
                zmax = (v[1].z > v[2].z) ? v[1].z : v[2].z ;
            }
        }
        else {
            if (v[2].z < v[3].z) {
                zmin = (v[1].z < v[2].z) ? v[1].z : v[2].z ;
                zmax = (v[0].z > v[3].z) ? v[0].z : v[3].z ;
            }
            else {
                zmin = (v[1].z < v[3].z) ? v[1].z : v[3].z ;
                zmax = (v[0].z > v[2].z) ? v[0].z : v[2].z ;
            }
        }
        if (zmin<Hither || zmax>Yon) goto Outside ;
    }
endif MOTIONBLUR && !GLOSS /*
 * The inside test has been unrolled for speed. This test usually takes
 * 6 comparisons and branches, 4 multiplications, and 1-3 assignments.
 * > If vertices 0 and 2 have different y signs, then both
 *    > The line from vertex 1 to either vertex 0 or vertex 2 crosses the x axis,
 *      depending on the sign of vertex 1.
 *    > The line from vertex 3 to either vertex 0 or vertex 2 crosses the x axis,
 *      depending on the sign of vertex 3.
 * > Otherwise, if vertices 0 and 2 have the same sign, then
 *    > The lines from vertex 1 to vertex 0 and vertex 2 either both cross the x
 *      axis or both do not cross the x axis, depending on the sign of vertex 1.
 *    > The lines from vertex 3 to vertex 0 and vertex 2 either both cross the x
 *      axis or both do not cross the x axis, depending on the sign of vertex 3.
 * For every line that crosses the x axis, we test the sign of the crossing
 * and toggle "inside" if the crossing is positive. At the end, "inside" is
 * set iff we encountered an odd number of positive x crossings.
 */
    inside = 0 ;
    if (v[0].y > 0.0) {
        if (v[2].y < 0.0) {
            if (v[1].y < 0.0)
                { if (v[1].x*v[0].y > v[1].y*v[0].x) inside = ~inside; }
            else
                { if (v[2].x*v[1].y > v[2].y*v[1].x) inside = ~inside; }       ...sample
            if (v[3].y < 0.0)
                { if (v[3].x*v[0].y > v[3].y*v[0].x) inside = ~inside; }
            else
                { if (v[2].x*v[3].y > v[2].y*v[3].x) inside = ~inside; }
        }
        else {
            if (v[1].y < 0.0) {
                if (v[1].x*v[0].y > v[1].y*v[0].x) inside = ~inside;
                if (v[1].x*v[2].y > v[1].y*v[2].x) inside = ~inside;
            }
            if (v[3].y < 0.0) {
                if (v[3].x*v[0].y > v[3].y*v[0].x) inside = ~inside;
                if (v[3].x*v[2].y > v[3].y*v[2].x) inside = ~inside;
            }
        }
    }
```

```
        else {
            if (v[2].y > 0.0) {
                if (v[1].y > 0.0)
                    { if (v[1].x*v[0].y < v[1].y*v[0].x) inside = !inside; }
                else
                    { if (v[2].x*v[1].y < v[2].y*v[1].x) inside = !inside; }
                if (v[3].y > 0.0)
                    { if (v[3].x*v[0].y < v[3].y*v[0].x) inside = !inside; }
                else
                    { if (v[2].x*v[3].y < v[2].y*v[3].x) inside = !inside; }
            }
            else {
                if (v[1].y > 0.0) {
                    if (v[1].x*v[0].y < v[1].y*v[0].x) inside = !inside;
                    if (v[1].x*v[2].y < v[1].y*v[2].x) inside = !inside;
                }
                if (v[3].y > 0.0) {
                    if (v[3].x*v[0].y < v[3].y*v[0].x) inside = !inside;
                    if (v[3].x*v[2].y < v[3].y*v[2].x) inside = !inside;
                }
            }
        }
    }

/*
 * If the sample point is inside the polygon, and the micropolygon
 * crosses the hither or yon plane, interpolate to find the value of
 * z at the sample point. Test whether this z is between the hither
 * and yon planes.
 */
    if (!inside) goto Outside ;

if (mp->flag.hitheryoncrossing) {
        z = lerpz (v) ;
        if (z<Hither || z>Yon) goto Outside ;
    }
    if (!VisFreeList) {
        int vismalloced, i ;
        VisFreeList = (struct visiblepoint *) malloc ((unsigned)VisMallocSize) ;
        vismalloced = VisMallocSize/sizeof(struct visiblepoint) ;
        NVis += vismalloced ;
        for (i=1, vp=VisFreeList; i<vismalloced; vp++, i++) {
            vp->next = vp+1 ;
        }
        vp->next = 0 ;
    } vp = VisFreeList ;
    VisFreeList = VisFreeList->next ;
    NVisInUse++ ;
    if (NVisInUse>NVisMaxUsed) NVisMaxUsed=NVisInUse ;

#if CSG
    vp->csgtree = mp->csgtree ;
    vp->csgnode = mp->csgnode ;
#endif CSG
    vp->glassbackopacity = mp->glassbackopacity ;
    vp->flag = mp->flag ;
    if (mp->flag.hitheryoncrossing) {
        vp->minz = z ;
        vp->maxz = z ;
        vp->flag.lerpdone = 1 ;
    }
    else {
        vp->minz = mp->min.z ;
        vp->maxz = mp->max.z ;
        vp->flag.lerpdone = 0 ;
    }
    bcopy ((char *)v,(char *)vp->v,sizeof(vp->v)) ;
#if GOURAUD
    if (mp->flag.gouraud)
        gouraud (v,mp,vp) ;
    else {
        vp->color = mp->color[0] ;
        vp->trans = mp->trans[0] ;
    }
```

```
      else
          vp->color = mp->color ;
          vp->trans = mp->trans ;
#endif GOURAUD
          vp->next = Point[nsample] ;
          Point[nsample] = vp ;
          Hit++ ;
          return ;

Outside:
          Miss++ ;
          return ;

/* bit reversal, but mapped back onto 0-n */ permute(i,n) {                                                                          permute
    register int j,a,b;
    j=0;
    for(b=1;b+b<n;b+=b) ;
    for(a=1;b>=1;a+=a,b/=2)
        if (i-b>=0) {i-=b; j+=a;}
    if (j>=n) j=a+1-j;
    return j;
} tablesinit(nx,ny) {                                                                     tablesinit
    register int i, j, s ;
    int x, y, t, f ;
    float dx, dy, dt, sum ;
    int width ;

NS = nx*ny;
    SamplesPerBucket = PixelsPerBucket * NS ;
    width = 1 + 2 * Border ;

/* malloc room for tables */
    if (Location) free((char *)Location) ;
    if (Filter) free((char *)Filter) ;
    if (Lens) free((char *)Lens) ;
    Location = (struct xy *)malloc(NS*sizeof(struct xy)) ;
    Filter = (float *)malloc(NS*width*width*sizeof(float)) ;
    Lens = (struct xy *)malloc(NS*sizeof(struct xy)) ;

/* Calculate table of random numbers */
    if (JitterFlag) {
        MaxXJitter = 1./nx;
        MaxYJitter = 1./ny;
        for (s=0; s<NJITTER; s++) {
            XJitter[s] = drand()/nx ;
            YJitter[s] = drand()/ny ;
            TJitter[s] = drand()/NS ;
            LXJitter[s] = drand()/nx ;
            LYJitter[s] = drand()/ny ;
        }
        MaxXJitter -= (float)0.999999 ;
        MaxYJitter -= (float)0.999999 ;
    }
    else {
        MaxXJitter = 0.5/nx;
        MaxYJitter = 0.5/ny;
        for (s=0; s<NJITTER; s++) {
            XJitter[s] = 0.5/nx ;
            YJitter[s] = 0.5/ny ;
            TJitter[s] = 0.5/NS ;
            LXJitter[s] = 0.5/nx ;
            LYJitter[s] = 0.5/ny ;
        }
        MaxXJitter -= (float)0.999999 ;
        MaxYJitter -= (float)0.999999 ;
    }
/* Calculate locations */                                                               ...tablesinit
    for (s=0, x=0; x<nx; x++) {
        for (y=0; y<ny; y++, s++) {
            t=permute(s,NS);
```

```
            Location[t].x = x / (float)nx ;
            Location[t].y = y / (float)ny ;
        }
    }

/* Create filter table. */
/* Calculate filter values for the center of each sampling region. */
    sum = 0.0 ;
    for (s=0, f=0; s<NS; s++) {
        for (j=0; j<width; j++) {
            for (i=0; i<width; f++, i++) {
                dx = Location[s].x + 0.5/nx - (i - Border +.5) ;
                dy = Location[s].y + 0.5/ny - (j - Border +.5) ;
                Filter[f] = (*FilterRoutine[FilterType])(dx,dy) ;
                sum += Filter[f] ;
            }
        }
    }

/* Normalize filter */
    for (i=0; i<NS*width*width; i++ )
        Filter[i] /= sum ;

/* Lens. This is a kludge for now - uses a square lens */
    for (s=0; s<NS; s++ ) {
        Lens[s].x = Location[s].x ;
        Lens[s].y = Location[s].y ;
    }
} static freelist (vp)                                              freelist
    register struct visiblepoint *vp ;
{
    register struct visiblepoint *p ;
    register int n ;

if (!vp) return ;
    for (p=vp, n=1; p->next; n++, p=p->next) ;
    p->next = VisFreeList ;
    NVisInUse -= n ;
    VisFreeList = vp ;
} static freepoints()                                               freepoints
{
    register int n ;
    register struct visiblepoint **head ;                         ...freepoints
    for (n=0, head=Point; n<SamplesPerBucket; head++, n++) {
        freelist (*head) ;
    }
} if CSG
/*-------------------- CSG code --------------------*/ define CSGDifferenceOp 1
define CSGIntersectionOp 2
define CSGUnionOp 3 define MAXTREE 64
static struct CSGnode *Tree[MAXTREE];

static int CSGNewTree(n,tree)                                     CSGNewTree
    int n;
    struct CSGnode *tree;
{
    if (n>=MAXTREE) {
        fprintf (stderr, "Maximum number of trees exceeded.\n") ;
        Error() ;
```

```
        return;
    }
    Tree[n] = tree;
} static int CSGResolve()
{
    int ntree ;
    register int n ;
    register struct visiblepoint **vp ;
    register struct visiblepoint *resolvedlist, *front, *vis ;
    struct visiblepoint *treelist ;
    struct visiblepoint *extract_csgtree(), *mergelists();
    struct visiblepoint *extract_csgnode(), *sortfront() ;

for (n=0, vp=Point; n<SamplesPerBucket; vp++, n++) {
        vis = 0 ;
        while (front=sortfront(vp)) {
            if (front->flag.pantshack) {
                *vp = front->next ;
                front->next = 0 ;
                freelist(front) ;
                front = sortfront(vp) ;
                if (front && front->flag.torsohack) {
                    *vp = front->next ;
                    front->next = 0 ;
                    freelist(front) ;
                }
            }
            else if (front->csgnode) {
                ntree = front->csgtree ;
                treelist = extract_csgtree (ntree, vp) ;
                csg_resolve_tree (Tree[ntree], 0, &treelist) ;
                resolvedlist = extract_csgnode (0, &treelist) ;
                freelist ( treelist ) ;
                *vp = mergelists (resolvedlist,*vp) ;
            }
            else {
                *vp = front->next ;
                if (vis) {
                    front->color.r *= vis->trans.r ;
                    front->color.g *= vis->trans.g ;
                    front->color.b *= vis->trans.b ;
                    front->color.r += vis->color.r ;
                    front->color.g += vis->color.g ;
                    front->color.b += vis->color.b ;
                    front->trans.r *= vis->trans.r ;
                    front->trans.g *= vis->trans.g ;
                    front->trans.b *= vis->trans.b ;
                }
                front->next = vis ;
                vis = front ;
                if (vis->flag.glasshack && *vp) {
                    float alpha, comp ;
                    front = sortfront(vp) ;
                    alpha = vis->glasshackopacity ;
                    comp = vis->color.r ;
                    vis->color.r *= alpha ;
                    vis->color.r += (1-alpha) * comp * front->color.r ;
                    comp = vis->color.g ;
                    vis->color.g *= alpha ;
                    vis->color.g += (1-alpha) * comp * front->color.g ;
                    comp = vis->color.b ;
                    vis->color.b *= alpha ;
                    vis->color.b += (1-alpha) * comp * front->color.b ;
                }
                if (vis->flag.opaque) break ;
            }
        }
        *vp = mergelists (vis, *vp) ;
    }
}
```

*CSGResolve*

*...CSGResolve*

```
static csg_resolve_surface (lista, listb, id, op)
    register struct visiblepoint *lista, *listb ;
    int id, op ;
{
    register int a, b ;

/* Go through two sorted lists of points, determining which points are
 * actually on the surface according to the specified csg operator.
 * Mark the points that are on the surface with the specified node id.
 * A point from listb is on the surface if "a" is set; a point from
 * lista is on the surface is "b" is set.
 * > For the union operator, accept points from lista iff we are outside
 *     of volume b, and accept points from listb iff we are outside of
 *     volume a.  Since we are initially outside of both volumes, "a" and
 *     "b" are both initially true.
 * > For the intersection operator, accept points from one list iff we
 *     are inside the other volume.  Since we are initially not inside
 *     either volume, "a" and "b" are both initially false.
 * > For the difference operator (a minus b), accept points from lista
 *     iff we are outside of volume b, and accept points from listb iff
 *     we are inside volume a.  Since we are initially outside of b and
 *     not inside a, "b" is initially true and "a" is initially false.
 * > For all three operators, toggle "a" or "b" when we pass through
 *     one of the surfaces of a or b, respectively.
 */
    a = b = 0 ;
    switch (op) {
    case CSGUnionOp:         a = ~a ;
    case CSGDifferenceOp:    b = ~b ;
    case CSGIntersectionOp:  break ;
    } while (lista && listb) {
        if (lista->minz < listb->minz) {
            if (b) lista->csgnode = id ;
            lista = lista->next ;
            a = ~a ;
        }
        else {
            if (a) listb->csgnode = id ;
            listb = listb->next ;
            b = ~b ;
        }
    }
    if (b)
        for (;lista;lista=lista->next) lista->csgnode = id ;
    if (a)
        for (;listb;listb=listb->next) listb->csgnode = id ;
} static struct visiblepoint *extract_csgnode (nodeid, list)
    int nodeid ;
    register struct visiblepoint **list ;
{
    register struct visiblepoint *thisid, *notthisid, *vp, *next ;

/* Extract all points with the specified node number from the list.
 * Return a pointer to the head of a new list containing only the
 * extracted points.
 */
    thisid = 0 ;
    notthisid = 0 ;
    next = *list ;
    while (vp=next) {
        next = vp->next ;
        if (vp->csgnode == nodeid) {
            vp->next = thisid ;
            thisid = vp ;
        }
        else {
            vp->next = notthisid ;
            notthisid = vp ;
```

```
        }
    }

*list = notthisid ;
    return thisid ;
} static struct visiblepoint *extract_csgtree (atree, list)
    int atree ;
    register struct visiblepoint **list ;
{
    register struct visiblepoint *intree, *notintree, *vp, *next ;

intree = notintree = 0 ;
    vp = *list ;
    while (vp) {
        next = vp->next ;
        if (vp->csgtree == atree) {
            vp->next = intree ;
            intree = vp ;
        }
        else {
            vp->next = notintree ;
            notintree = vp ;
        }
        vp = next ;
    }

*list = notintree ;
    return intree ;
} static struct visiblepoint *findfront(list)
    register struct visiblepoint *list;
{
    register struct visiblepoint *front, *vp ;

/* This routine returns a pointer to the frontmost point of a list
 * of visiblepoints. The z value of each point is stored as the
 * minimum and maximum z values of its micropolygon. The exact
 * z value is only calculated (by interpolation) if it is needed.
 * The exact value is stored in both the minimum and maximum z fields.
 * > Find the point 'front' with the smallest minimum z.
 * > If that point has an interpolated z value, we're done.
 * > If that point's maximum z value is in front of the minimum z
 *   of every other point, we're done.
 * > Otherwise we go through the list again, this time using the
 *   exact values of z calculated by interpolation.
 */
    if (!list) return 0 ;

for (front=vp=list; vp; vp=vp->next)
        if (vp->minz < front->minz)
            front = vp ;

if (front->flag.lerpdone) goto Done ;

for (vp=list; vp; vp=vp->next)
        if (vp!=front && vp->minz<front->maxz) goto Lerp;
    goto Done;

Lerp:
    front->minz = front->maxz = lerpz(front->v) ;
    front->flag.lerpdone = 1 ;
    for (vp=list; vp; vp=vp->next) {
        if (vp->minz < front->minz) {
            if (vp->flag.lerpdone)
                front = vp ;
            else {
                vp->minz = vp->maxz = lerpz(vp->v) ;
                vp->flag.lerpdone = 1 ;
                if (vp->minz < front->minz)
                    front = vp ;
```

*extract_csgtree*

*findfront*

*...findfront*

```
            }
          }
        }
Done:
        return front ;
} static struct visiblepoint *mergelists(a,b)                         mergelists
    register struct visiblepoint *a, *b ;
{
    register struct visiblepoint *p ;

if (!a) return b ;
    if (!b) return a ;

for (p=a; p->next; p=p->next) ;
    p->next = b ;
    return a;
} static csg_resolve_tree (node, id, list)                            csg_resolve_tree
    register struct CSGnode *node ;
    int id :
    register struct visiblepoint **list ;                           _csg_resolve_tree
{
    struct visiblepoint *list0, *list1 ;
    struct visiblepoint *extract_csgnode(), *mergelists() ;

if (node->child[0]) csg_resolve_tree (node->child[0], node->id[0], list);
    if (node->child[1]) csg_resolve_tree (node->child[1], node->id[1], list);
    list0 = extract_csgnode (node->id[0], list) ;
    list1 = extract_csgnode (node->id[1], list) ;
    if (list0 || list1) {
        if (list0) sortlist (&list0) ;
        if (list1) sortlist (&list1) ;
        csg_resolve_surface (list0, list1, id, node->op) ;
        *list = mergelists (list0,*list) ;
        *list = mergelists (list1,*list) ;
    }
} static struct visiblepoint *sortfront(head)                         sortfront
    register struct visiblepoint **head;
{
    register struct visiblepoint *prev, *temp, *vp, *front ;
/*
 * (*head) points to a list of visible points. This routine puts
 * the frontmost point at the head of the list.
 */
    if (!*head) return 0 ;
    front = findfront(*head) ;
    for (prev= *head, vp=prev->next; vp; prev=vp, vp=vp->next) {
        if (vp==front) {
            prev->next = front->next ;
            front->next = *head ;
            *head = front ;
            return *head ;
        }
    }
    return *head ;
} static sortlist (list)                                              sortlist
    register struct visiblepoint **list ;
{
    if ((*list)->next) {
        (void) sortfront (list) ;
        sortlist (&((*list)->next)) ;
    }
}
```

```
else
static int CSGNewTree(){;}
static int CSGResolve(){;}
#endif CSG
/* ssvis.h 1.9 85/05/20 */ include <reyes.h> struct visflags {
    unsigned        moving : 1 ;
    unsigned        opaque : 1 ;
    unsigned        cubicmotion : 1 ;
    unsigned        matte : 1 ;
    unsigned        hitberyoncrossing : 1 ;
    unsigned        krpdone : 1 ;
    unsigned        gouraud : 1 ;
unsigned pantsback : 1 ;
unsigned torsoback : 1 ;
unsigned glassback : 1 ;
    } ;

struct mpoly {
    struct mpoly        *next ;
    int                 minx, miny, maxx, maxy ;
    struct xyz          min, max ;
    struct xyz          v[4] ;
#if MOTIONBLUR
    struct xyz          speed[4] ;
#if CUBICMOTION
    struct xyz          speed2[4] ;
    struct xyz          speed3[4] ;
#endif CUBICMOTION
#endif MOTIONBLUR
#if GOURAUD
    struct color        color[4] ;
    struct color        trans[4] ;
#else
    struct color        color ;
    struct color        trans ;
#endif GOURAUD
#if CSG
    short               csgtree, csgnode ;
#endif CSG
#if DEPTHOFFIELD
    struct xy           dofborder ;
#endif DEPTHOFFIELD
    float               glasshackopacity ;
    struct visflags     flag ;
} ;

extern float Dofx_a, Dofx_b, Dofy_a, Dofy_b ;
extern int PinHoleCamera ;
```

APPENDIX B

Copyright 1985 Lucasfilm Ltd.

/u0/tom/patent/pray.c                    /u0/tom/patent/pray.c

...*lighthit*

```
        }
    if (hitlight != NULL)
            return(hitalpha);
    return(-1.);
} disperseray(oldray,maxdispersionangle)                       disperseray
vector oldray;
double maxdispersionangle;
    {
    double phi,theta,rho;
    double a,b,c,v,x,y,z;
    phi = drand()*drand()*maxdispersionangle;
    theta = drand()*2*PI;
    a = oldray[0];
    b = oldray[1];
    c = oldray[2];
    rho = sqrt((double)(a*a+b*b+c*c));
    a = a/rho; b = b/rho; c = c/rho;
    x = rho*sin(phi)*cos(theta);
    y = rho*sin(phi)*sin(theta);
    z = rho*cos(phi);
    if ((v = sqrt((double)(b*b+c*c))) != 0)
            {
            oldray[0] = (x*a + z*a);
            oldray[1] = ( y*c - b*x*a + b*z*a)/v;
            oldray[2] = (-b*y - c*x*a + c*z*a)/v;
            }
    else
            {
            oldray[0] = z*a;
            oldray[1] = y;
            oldray[2] = -x*a;
            }
    }
struct color
trace(viewing, level,time)                                   trace
register struct ray *viewing;
float time;
    {
    double alpha,beta;
    struct ray newray;
    double diffuse, vdotn, kf, kn, specular, reflectionlength;
    struct color tracecolor, viewcolor, spherecolor;
    double spherereflectivity,spherebump;
    vector normal, incoming, reflection, tempvect, center;
    double radius;
    register struct sphere *hp;
    register struct light *dptr;
    matrix tempmatrix;
    double spinangle;

/*printf("trace(ray:[%f,%f,%f,%f,%f,%f],%d,%f)\n",
viewing->endpoint[0],
viewing->endpoint[1],
viewing->endpoint[2],
viewing->direction[0],
viewing->direction[1],
viewing->direction[2],
level,time);*/ alpha = spherehit(viewing,time,(level==0) && !translucencyray);
    beta = lighthit(viewing,time);                           ...trace
    if ((beta >= 0) && ((alpha < 0) || (beta < alpha)))
            return(hitlight->rgb);
    if (alpha < 0.)
            return(nullcolor);
    viewcolor.red =
    viewcolor.grn =
    viewcolor.blu = 0;
    viewcolor.alf = 1.;
    hp = hitsphere;
    VxAddLerp(alpha,viewing->endpoint,viewing->direction,newray.endpoint);

FindCenter(hp,time,center);
    radius = hp->radius;

normal[0] = (newray.endpoint[0]-center[0])/radius;
    normal[1] = (newray.endpoint[1]-center[1])/radius;
    normal[2] = (newray.endpoint[2]-center[2])/radius;
    normal[3] = 1.;
```

```
/*
    put normal through inverse transformation in order to extract
    original position on sphere.

that original position is then used to look up the parameters
    for the sphere
*/
        {
            double duration;
            struct movement *mptr;

mptr = hp->mptr;
            VxCopy(normal,tempvect);
            MxVectorMultiply(tempvect,hp->M,tempvect);
            while (mptr)
                {
                    if (mptr->starttime >= time) break;
                    MxVectorMultiply(tempvect,mptr->MR1MR2,tempvect);
                    if (mptr->mptr)
                            if (mptr->mptr->starttime >= time)
                                    duration = time - mptr->starttime;
                            else
                                    duration = mptr->mptr->starttime - mptr->starttime;
                    else
                            duration = time - mptr->starttime;
                    spinangle = MxDegrees(duration*VxLength(mptr->translate)/hp->radius);
                    MxRotate(spinangle,'z',tempmatrix);
                    MxVectorMultiply(tempvect,tempmatrix,tempvect);
                    MxVectorMultiply(tempvect,mptr->IR2IR1,tempvect);
                    mptr = mptr->mptr;
                }
        }

/*
    now tempvect contains the original position of this endpoint in the
    picture map for this sphere.
*/
            spherebump = hp->phong;
            if (ABS(tempvect[2]) < halfstripewidth)
                {
                    spherecolor = hp->stripecolor;
                    spherereflectivity = spherecolor.alf;
                }
            else
            if ((ABS(tempvect[2]) < halfringwidth))
                {
/*% cc -go -o S cook.o boundsphere.o -lG -lrpac -lpicio -llkp -lee -lmx -lam -lm
*/
#include <stdio.h>
#include <aarg.h>
#include <math.h>
#include <picio.h>
#include <rpac.h>
#include <ikehack.h>
#include <bliss.h>
#include <MxMatrix.h>
include <BuniOpen.h> include <rrand.h> include <VxVector.h> define SS 64
define XSIZE 512
define YSIZE 488 int spfx = XSIZE;
int spfy = YSIZE;
int ppfx = XSIZE;
int ppfy = YSIZE;
int ppx = 1;
int mize = 0;
int rpp = SS;

#define VPIX    .7868852459         /* = 48/61, vertical height of a pixel */
#define MAXLEVEL 1
define NSPHERE 100 int translucencyray = FALSE;

double fieldofview = 30.;
vector viewpoint;
matrix normalizer,inversenormalizer;

double halfstripewidth  = .4722;
double halfringwidth    = .85;
double linethickness    = .05;
double ringradius       = .44;
/* ringradius = sqrt(1-(halfringwidth+linethickness)^2) */
```

```
int dms = 0;

int ystart = 0;
int yend = 100000;
setystart()                                                                    setystart
        {
                ystart = atoi(aargv[1]);
                yend = atoi(aargv[2]);
                if (yend < ystart)
                        {
                        fprintf(stderr,"bad y bounds\n");
                        exit(1);
                        }
        }
int debug = FALSE;
setdebug() {debug = TRUE;}                                                     setdebug struct color
        {
        double red, grn, blu, alf;
        };
struct color nullcolor = {0.,0.,0.,0.};
struct color ivorycolor = {0.85,0.85,0.55,0.8};
double ivorybump = 1000.;
double ivoryreflectivity = 0.8;
struct color blackcolor = {0.05,0.05,0.05,1.};
double blackbump = 1000.;
double blackreflectivity = 0.8;

struct window {int minx,maxx,miny,maxy;};

struct movement
        {
        matrix MR1,MR2,IR2,IR1;
        double starttime;
        vector translate;
        struct movement *mptr;
        };
struct sphere
        {
        vector center;
        double radius;
        matrix M;
        struct color outsidecolor,stripecolor;
        struct movement *mptr;
        double refractiveindex;         /* refractive index */
        double transmitivity;           /* fractional intensity of transmitted rays */
        double specularity;             /* amount of specular reflection */
        double phong;                   /* specular bump width (Phong exponent) */
        double reflectiondispersion;
        double transmissiondispersion;
        int active;
        struct window w;
        BuniPtrType buniptr;
        int fbxsize,fbysize;
        }
sphere[NSPHERE];

struct sphere *esphere = sphere;

#define NLIGHT 50
struct light
        {
        vector location0;
        double intensity0;
        vector location1;
        double intensity1;
        double radius;
        struct color rgb;
        }
light[NLIGHT];

struct light *elight = light;

double ambient;

struct ray
        {
        vector endpoint,direction;
        };

struct sphere *hitsphere;
struct light  *hitlight;

#define EPSILON 1e-6

FindCenter(sptr,time,center)                                                   FindCenter
struct sphere *sptr;
double time;
vector center;
```

```
{
        double duration;
        struct movement *mptr;

VxCopy(sptr->center,center);
        mptr = sptr->mptr;
        while (mptr)
                {
                if (mptr->starttime >= time) break;
                if (mptr->mptr)
                        if (mptr->mptr->starttime >= time)
                                duration = time - mptr->starttime;
                        else
                                duration = mptr->mptr->starttime - mptr->starttime;
                else
                        duration = time - mptr->starttime;
                VxAddLerp(duration,center,mptr->translate,center);
                mptr = mptr->mptr;
                }
} double                                                                          spherehit
spherehit(oldray,time,level0)
register struct ray *oldray;
float time;
{
        register struct sphere *sptr;
        double hitalpha;
        double alpha, discriminant, a, b, c;
        vector newendpoint;
        vector center;
        double radius;

/*printf(" spherehit(ray:(%f,%f,%f,%f,%f,%f),%f)\n",
oldray->endpoint[0],oldray->endpoint[1],oldray->endpoint[2],
oldray->direction[0],oldray->direction[1],oldray->direction[2],time);*/

/* This routine tries to find a point on the sphere sptr and the oldray.
   Using alpha as the extent of the ray beyond oldray->endpoint,
   a quadratic in alpha can be formed whose coefficients a, b, c are
   as computed below.
*/ hitsphere = NULL;
        a = VxDot(oldray->direction,oldray->direction);
        for (sptr = sphere; sptr != esphere; sptr++)
                {
                if (!level0 || sptr->active)
                        {
                        FindCenter(sptr,time,center);
                        radius = sptr->radius;

VxSubtract(oldray->endpoint,center,newendpoint);
                        b = 2*VxDot(newendpoint,oldray->direction);
                        c = VxDot(newendpoint,newendpoint)-radius*radius;
                        if ((discriminant = b*b - 4*a*c)<0.)
                                        continue;
```
...spherehit
```
                        discriminant = sqrt((double)discriminant);

alpha = (-b+discriminant)/(2*a);
                        if (EPSILON < alpha &&
                            (hitsphere == NULL || alpha < hitalpha))
                                {
                                hitalpha = alpha;
                                hitsphere = sptr;
                                } alpha = (-b-discriminant)/(2*a);
                        if (EPSILON < alpha &&
                            (hitsphere == NULL || alpha < hitalpha))
                                {
                                hitalpha = alpha;
                                hitsphere = sptr;
                                }
                        }
                }
        if (hitsphere != NULL)
                return(hitalpha);
        return(-1.);
} double                                                                          lighthit
lighthit(oldray,time)
register struct ray *oldray;
float time;
{
        register struct light *lptr;
        double hitalpha;
        double alpha, discriminant, a, b, c;
```

```
vector newendpoint;
vector center;
double radius;

hitlight = NULL;
a = VxDot(oldray->direction,oldray->direction);
for (lptr = light; lptr != elight; lptr++)
    {
        VxLerp(time,lptr->location0,lptr->location1,center);
        radius = lptr->radius;
        VxSubtract(oldray->endpoint,center,newendpoint);
        b = 2*VxDot(newendpoint,oldray->direction);
        c = VxDot(newendpoint,newendpoint)-radius*radius;
        if ((discriminant = b*b - 4*a*c)<0.)
                continue;
        discriminant = sqrt((double)discriminant);

alpha = (-b+discriminant)/(2*a);
        if (EPSILON < alpha &&
            (hitsphere == NULL || alpha < hitalpha))
                {
                hitalpha = alpha;
                hitlight = lptr;
                } alpha = (-b-discriminant)/(2*a);
        if (EPSILON < alpha &&
            (hitsphere == NULL || alpha < hitalpha))
                {
                hitalpha = alpha;
                hitlight = lptr;
                }
                                                                    ...trace spherecolor = hp->outsidecolor;
            spherereflectivity = spherecolor.all;
            }
    else
    if (ABS(tempvect[2]) < halfringwidth+linethickness)
        {
        if (hp->outsidecolor.red != hp->stripecolor.red)
            {
            spherecolor = blackcolor;
            spherereflectivity = blackreflectivity;
            spherebump = blackbump;
            }
        else
            {
            spherecolor = ivorycolor;
            spherereflectivity = ivoryreflectivity;
            spherebump = ivorybump;
            }
        }
    else
    if (hp->buniptr)
        {
        int mapx,mapy;
        RGBAPixelType RGBA;

{
            if (tempvect[2] > 0)
                {
mapx = hp->fbxsize*(1 + (atan(tempvect[0]/tempvect[2])/(PI/2))/ringradius)/2;
mapy = hp->fbysize*(1 - (atan(tempvect[1]/tempvect[2])/(PI/2))/ringradius)/2;
                }
            else
                {
mapx = hp->fbxsize*(1 + (atan(tempvect[0]/tempvect[2])/(PI/2))/ringradius)/2;
mapy = hp->fbysize*(1 - (atan(tempvect[1]/tempvect[2])/(PI/2))/ringradius)/2;
                }

SetBuniY(hp->buniptr,mapy);
            SetBuniX(hp->buniptr,mapx);
            GetBuniRGBA(hp->buniptr,&RGBA);
            spherecolor.red = RGBA.Red /4095.;
            spherecolor.grn = RGBA.Green/4095.;
            spherecolor.blu = RGBA.Blue /4095.;
            spherereflectivity = RGBA.Alpha/4095.;
            spherebump = 1000;
            }
        }
    else
        {
        spherecolor = ivorycolor;
        spherereflectivity = ivoryreflectivity;
        spherebump = ivorybump;
        } vdotn = VxDot(normal,viewing->direction);
    if (vdotn > 0.)
        {
```

```
                    VxNegate(normal,normal);
                    kn = 1./hp->refractiveindex;
                    }
            else
                    {
                    vdotn = -vdotn;
                    kn = hp->refractiveindex;
                    }
            if(vdotn != 0.)
                    VxScalarMultiply(1/vdotn,viewing->direction,incoming);
            /* the only difference between the viewing direction and the incoming
               vector is this factor of 1/vdotn, 1 over the sin of the angle
               between the viewing vector and the normal
             */
            if (vdotn == 0.)
                    VxCopy(viewing->direction,reflection);
            else
                    VxAddLerp(2.,incoming,normal,reflection);

disperseray(reflection,hp->reflectiondispersion);

reflectionlength = VxLength(reflection);

/*
             * first, get the lightsource components
             */
            viewcolor.red = spherecolor.red*ambient;
            viewcolor.grn = spherecolor.grn*ambient;
            viewcolor.blu = spherecolor.blu*ambient;

for (lptr = light; lptr != elight; lptr++)
                    {
                    double intensity;
                    vector lightcenter;
                    vector random;
                    random[3] = 1;
                    for (;;)
                            {
                            random[0] = 2*drand()-1;
                            random[1] = 2*drand()-1;
                            random[2] = 2*drand()-1;
                            if (VxLength(random) <= 1) break;
                            }
                    VxScalarMultiply(lptr->radius,random,random);

VxLerp(time,lptr->location0,lptr->location1,lightcenter);
                    VxAdd(lightcenter,random,newray.direction);
                    VxSubtract(newray.direction,newray.endpoint,newray.direction);
                    VxNormalize(newray.direction,newray.direction);

if (spherehit(&newray,time,FALSE) > 0.)
                            continue;
                    specular = VxDot(newray.direction,reflection)/reflectionlength;
                    if (specular < 0.) specular = 0.;
                    /*
                     * Plastic alert
                     */
                    intensity = lptr->intensity0 + time*(lptr->intensity1-lptr->intensity0);
                    /* specular = intensity * hp->specularity * pow(specular, spherebump); */
                    specular = hp->specularity * pow(specular, spherebump);
                    diffuse = intensity * VxDot(newray.direction,normal);
                    viewcolor.red += specular + diffuse*spherecolor.red;
                    viewcolor.grn += specular + diffuse*spherecolor.grn;
                    viewcolor.blu += specular + diffuse*spherecolor.blu;
                    }
            if (level == MAXLEVEL)
                    return(viewcolor);
            /*
             * Now, the reflected component
             */
            if (spherereflectivity != 0.)
                    {
/*
            double exp(), alpha;
*/
                    VxCopy(reflection,newray.direction);
                    tracecolor = trace(&newray, level+1,time);
                    viewcolor.red += tracecolor.red*spherereflectivity;
                    viewcolor.grn += tracecolor.grn*spherereflectivity;
                    viewcolor.blu += tracecolor.blu*spherereflectivity;
/*
            if ((alpha = spherehit(&newray,time,FALSE) * VxLength(newray.direction)) > 0)
                    {
            viewcolor.red -= spherecolor.red*ambient*spherereflectivity*exp(-alpha);
            viewcolor.grn -= spherecolor.grn*ambient*spherereflectivity*exp(-alpha);
            viewcolor.blu -= spherecolor.blu*ambient*spherereflectivity*exp(-alpha);
                    }
*/
```

```
                }
        /*
         * Now, the transmitted component
         */
        if (hp->transmitivity != 0. && vdotn != 0.)
                {
                VxAdd(incoming,normal,tempvect);
                kf = kn * kn * VxDot(incoming,incoming) - VxDot(tempvect,tempvect);
                if (kf > 0.)
                        {
                        kf = 1./sqrt((double)kf);
                        newray.direction[0] = kf*(normal[0]+incoming[0]) - normal[0];
                        newray.direction[1] = kf*(normal[1]+incoming[1]) - normal[1];
                        newray.direction[2] = kf*(normal[2]+incoming[2]) - normal[2];
                        newray.direction[3] = 1.;

disperseray(newray.direction,hp->transmissiondispersion);
/* printf("trace(ray:(%f,%f,%f,%f,%f,%f),%d,%f) -> ",
        newray.endpoint[0],
        newray.endpoint[1],
        newray.endpoint[2],
        newray.direction[0],
        newray.direction[1],
        newray.direction[2],
        level+1,time); */
                        translucencyray = TRUE;
                                        tracecolor = trace(&newray, level,time);
                        translucencyray = FALSE;
/* printf("%f,%f,%f\n",tracecolor.red,tracecolor.grn,tracecolor.blu); */
                                        viewcolor.red += tracecolor.red*hp->transmitivity;
                                        viewcolor.grn += tracecolor.grn*hp->transmitivity;
                                        viewcolor.blu += tracecolor.blu*hp->transmitivity;
                                        }
                        }
                return(viewcolor);
                }
pv12(x)                                                                                 pv12
double x;
        {
        return((int)(16*drand()+4080.*(x<0.?0.:1.<x?1.:x)));
        } double Fn = 0.0;
double focaldistance = 1.0;

struct color eyetrace(x, y, t)
double x, y, t;
        {
        struct ray ray;
        vector screentarget,modeltarget,focaltarget,direction;
        double filmplanedistance;

/* printf("eyetrace(%f,%f,%f)\n",x,y,t); */
        screentarget[0] = x;
        screentarget[1] = y;
        screentarget[2] = 1.;
        screentarget[3] = 1.;
        MxVectorMultiply(screentarget,inversenormaliser,modeltarget);
        VxSubtract(modeltarget,viewpoint,direction);
        filmplanedistance = VxLength(direction);
        VxAddLerp(focaldistance/filmplanedistance,viewpoint,direction,focaltarget);
                {
                vector random;
                random[2] = 0;
                random[3] = 1;
                for (;;)
                        {
                        random[0] = 2*drand()-1;
                        random[1] = 2*drand()-1;
                        if (VxLength(random) <= 1) break;
                        }
                VxScalarMultiply(Fn,random,random);
                MxVectorMultiply(random,inversenormaliser,ray.endpoint);
                }
        VxSubtract(focaltarget,ray.endpoint,ray.direction);
        return(trace(&ray, 0, t));
        }

PFILE *picfile;

extern struct xy {float x,y;} Location[];
extern float Times[];
extern float Filter[4][SS][3][3];

double t0 = 0.0;
double t1 = 1.0;
settime()                                                                               settime
        {
        t0 = atof(aargv[1]);
```

```
                t1 = atoi(aargv[2]);
        }
setppfxy()
        {
                ppfx = atoi(aargv[1]);
                ppfy = atoi(aargv[2]);
                spfx = 1 + (ppfx-1)/pps;
                spfy = 1 + (ppfy-1)/pps;
        }
setssize()
        {
                ssize = atoi(aargv[1]);
                pps = 1 << ssize;
                spfx = 1 + (ppfx-1)/pps;
                spfy = 1 + (ppfy-1)/pps;
                rpp = SS/(pps*pps);
        }
struct aarg_cmd cmd[]={
        0,setppfxy,        "[-s %d %d]","ppfx ppfy",0,0,0,0,
        0,setssize,        "[-ss %d<0,3>]","ssize: 0, 1, 2, 3",0,0,0,0,
        0,settime,         "[-t %f %f]","starttime endtime",0,0,0,0,
        0,setdebug,        "[-d]","debug",0,0,0,0,
        0,setystart,       "[-y %d %d]","compute sample area %d to %d in y",0,0,0,0,
        0,0,(char *)std_cmd,0,0,0,0,
        0,0,0,0,0,0,0,0
};

remain(argc, argv)
char *argv[];
        {
        vector viewdirection,updirection,focuspoint,uppoint;
        char fname[128];
        char label[256];
        int x,y;
        register struct light *lptr;
                vector abc;
                matrix MR1,MR2;
        int c;
        struct color pixel[SS];

yend = MIN(yend,spfy-1);
        sprintf(label,"pray -s %d %d -ss %d -t %f %f -y %d %d",
                    ppfx,ppfy,ssize,t0,t1,ystart,yend);
        PicSetLabel(label);
        PicSetPsize(ppfx,(yend-ystart+1)*pps);
        PicSetTsize(ppfx,(yend-ystart+1)*pps);
        PicSetPformat(PF_RGBA);
        PicSetPmatting(PM_MTD);
        PicSetForce(1);
        PicSetOffset(0,ystart*pps);
        if((picfile=PicCreat(argv[1], 0444))==NULL){
                fprintf(stderr, "sphere: Can't create %s\n", argv[1]);
                exit(1);
        }
        picPreEncodeScanline(picfile, 0L);
        /*
         * Read some input
         */
        while((c=getchar()) != EOF) switch(c){
        case ' ': case '\t': case '\n':         break;
        case '#': do c=getchar(); while(c != '\n' && c != EOF); break;
        case 'f': if (scanf("%lf",&fieldofview) != 1)
                        fprintf(stderr,"Invalid field of view \n");
                break;
        case 'e':
                  if(scanf("%lf%lf%lf%lf%lf%lf%lf%lf%lf",
                        &viewpoint[0],&viewpoint[1],&viewpoint[2],
                        &focuspoint[0],&focuspoint[1],&focuspoint[2],
                        &uppoint[0],&uppoint[1],&uppoint[2]
                        ) != 9)
                        fprintf(stderr, "Invalid viewpoint\n");
                  else
                        {
                        uppoint[3] = 1;
                        viewpoint[3] = 1.;
                        focuspoint[3] = 1.;
                        VxSubtract(focuspoint,viewpoint,viewdirection);
                        focaldistance = VxLength(viewdirection);
                        VxSubtract(uppoint,viewpoint,updirection);
                        }
                break;
        case 'a':
                  if(scanf("%lf", &ambient) != 1)
                        fprintf(stderr, "Invalid ambient light\n");
                break;
        case 's':
                {
                double azimuth,pitch,roll;
```

```
if(scanf("%s%lf%lf%lf%lf%lf%lf%lf%lf%lf%lf%lf%lf%lf%lf%lf%lf%lf%lf%lf%s",
        &esphere->center[0], &esphere->center[1], &esphere->center[2],
        &esphere->radius,
        &azimuth,&pitch,&roll,
        &esphere->outsidecolor.red,&esphere->outsidecolor.grn,&esphere->outsidecolor.blu,&esphere->outsidecolor.alf,
        &esphere->stripecolor.red,&esphere->stripecolor.grn,&esphere->stripecolor.blu,&esphere->stripecolor.alf,
        &esphere->refractiveindex, &esphere->transmitivity,
        &esphere->specularity,&esphere->phong,
        fbname
        ) != 20)
                    fprintf(stderr, "Invalid sphere\n");
        else
                    {
                    double v;
                    matrix tempmatrix;
                    FbErrors(FBIGNORE);
                    if ((esphere->buniptr = FbOpen(fbname)) == NULL)
                            {
                            fprintf(stderr,"cannot open %s\n",fbname);
                            }
                    else
                            {
                            BuniCSRType csr;
                            esphere->fbxsize = GetXSize(esphere->buniptr);
                            esphere->fbysize = GetYSize(esphere->buniptr);
                            csr.ChannelSel = 017;          /* all */
                            csr.AutoIncDec = INCREMENT;
                            csr.WriteTrigger = ALPHA_TRIGGER;
                            csr.ReadTrigger = RED_TRIGGER;
                            csr.XYMod = X_MOD;
                            csr.DumpXY = 0;
                            csr.WriteAddrMod = 0;
                            csr.ReadAddrMod = 0;
                            csr.LerpMode = 0;
                            csr.LerpRequest = 0;
                            SetBuniCSR(esphere->buniptr, csr);
                            fprintf(stderr,"%s: %d %d\n",fbname,esphere->fbxsize,esphere->fbysize);
                            }
                    MxRotate(azimuth,'z',esphere->M);
                    MxRotate(pitch  ,'y',tempmatrix);
                    MxMultiply(esphere->M,tempmatrix,esphere->M);
                    MxRotate(roll   ,'z',tempmatrix);
                    MxMultiply(esphere->M,tempmatrix,esphere->M);

esphere->center[3] = 1.;
                    esphere->mptr = 0;
                    esphere->reflectiondispersion = 0;
                    esphere->transmissiondispersion = 0;
                    esphere++;
                    }
        }
        break;
case 'h':
        {
        int spherenumber;
        double starttime;
        if(scanf("%d%lf%lf%lf%lf",
                &spherenumber,&starttime,
                &abc[0],&abc[1],&abc[2]) != 5)
                fprintf(stderr, "Invalid hit\n");
                                                                ...remain
        else
                {
                struct movement *oldmptr,*newmptr;
                double v;
                abc[3] = 1.;
                newmptr = (struct movement *) malloc(sizeof(struct movement));
                if (oldmptr = sphere[spherenumber].mptr)
                        {
                        while (oldmptr->mptr) oldmptr = oldmptr->mptr;
                        oldmptr->mptr = newmptr;
                        }
                else
                        sphere[spherenumber].mptr = newmptr;

newmptr->mptr = 0;
                newmptr->starttime = starttime;
                VxCopy(abc,newmptr->translate);

/*
abc is the translation vector for the moving sphere.
Let us take a perpendicular vector to it in the same z plane
and follow the formulas from page 256 of Newman & Sproull, v1
for rotating about an arbitrary vector.
*/
                {double temp; temp = abc[0]; abc[0] = abc[1]; abc[1] = -temp;}

VxNormalize(abc,abc);
                v = sqrt((double)(abc[1]*abc[1] + abc[2]*abc[2]));
```

```
                MxIdentity(MR1);
                MR1[1][1] = MR1[2][2] = abc[2]/v ;
                MR1[2][1] = -(MR1[1][2] = abc[1]/v);
                MxIdentity(MR2);
                MR2[0][0] = MR2[2][2] = v ;
                MR2[2][0] = -(MR2[0][2] = abc[0]);
                MxMultiply(MR1,MR2,newmptr->MR1MR2);
                MR1[2][1] = -MR1[2][1];
                MR1[1][2] = -MR1[1][2];
                MR2[2][0] = -MR2[2][0];
                MR2[0][2] = -MR2[0][2];
                MxMultiply(MR2,MR1,newmptr->MR2MR1);
            }
            break;
    case 'l':
            if(scanf("%lf%lf%lf%lf%lf%lf%lf%lf",
                    &elight->location0[0], &elight->location0[1], &elight->location0[2],
                    &elight->intensity0,
                    &elight->location1[0], &elight->location1[1], &elight->location1[2],
                    &elight->intensity1,
                    &elight->radius) != 9)
                    fprintf(stderr, "Invalid light\n");
            else
                    {
                    elight->location0[3] = 1.;
                    elight->location1[3] = 1.;
                    elight->rgb.red =
                    elight->rgb.grn =
                    elight->rgb.blu =
                    elight->rgb.alf = 1.;
                    elight++;
                    }
            break;
    case 'p':
            {double dummy;                                                    ...remain if(scanf("%lf%lf%lf%lf",&dummy,&dummy,&dummy,&dummy) != 4)
                    fprintf(stderr, "Invalid plane\n");
            }
            break;
    case 'm':
            halfstripewidth = halfringwidth = linethickness = 0;
            ringradius = 1.01;
            break;
    case 'c':
            if(scanf("%lf",&Fn) != 1)
                    fprintf(stderr, "Invalid camera lens\n");
            break;
    case 'b':
            if(scanf("%d",&dmz) != 1)
                    fprintf(stderr, "Invalid border\n");
            break;
    default:
            fprintf(stderr, "Unrecognised command ");
            do
                    {
                    putc(c, stderr);
                    c=getchar();
                    }
            while (c != EOF && c != '\n');
            putc('\n', stderr);
            }
    printf("%d spheres, %d lights\n", esphere-sphere, elight-light);

/*
    for (lptr = light; lptr != elight; lptr++)
        {
        VxNormalize(lptr->location0,lptr->location0);
        VxNormalize(lptr->location1,lptr->location1);
        }
*/
    allocatecolorlinebuffers();
    if (debug)
            {
            fprintf(stderr,"pps = %3d\n",pps);
            fprintf(stderr,"(ppfx,ppfy) = (%3d,%3d)\n",ppfx,ppfy);
            fprintf(stderr,"(spfx,spfy) = (%3d,%3d)\n",spfx,spfy);
            }

/*oldway
    CvuCamera(viewpoint,focuspoint,uppoint,0.);
*/
    CvuCamera(dblviewpoint,dblviewdirection,dblupdirection,0.);

CvuPerspective(fieldofview,1.333333,0.1,5.0);
    CvuGetN(normalizer);
    MxInvert(normalizer,inversenormalizer);
CvuViewPrint();
/*
    CvuSetScreenWindow(ppfx-1.,0.,ppfy-1.,0.,255.,0.);
```

```
CvuSetScreenWindow(0.,spfx-1.,0.,spfy-1.,0.,255.);
{
struct sphere *sptr;
matrix N,P,S,T;
CvuGetN(N);

CvuGetP(P);

CvuGetS(S);

for (sptr = sphere; sptr != esphere; sptr++)
    {
    vector center;
    struct window w0,w1;
    FindCenter(sptr,t0,center);
    MxTranslate((double)center[0],
                (double)center[1],
                (double)center[2],T);
    MxMultiply(T,N,T);
    MxMultiply(T,P,T);
    MxMultiply(T,S,T);
    boundsphere(sptr->radius,T,&w0);

FindCenter(sptr,t1,center);
    MxTranslate((double)center[0],
                (double)center[1],
                (double)center[2],T);
    MxMultiply(T,N,T);
    MxMultiply(T,P,T);
    MxMultiply(T,S,T);
    boundsphere(sptr->radius,T,&w1);

if (w0.minx > w1.minx) w0.minx = w1.minx;
    if (w0.miny > w1.miny) w0.miny = w1.miny;
    if (w0.maxx < w1.maxx) w0.maxx = w1.maxx;
    if (w0.maxy < w1.maxy) w0.maxy = w1.maxy;

{
        double duration;
        struct movement *mptr;

VxCopy(sptr->center,center);
        if (mptr = sptr->mptr)
            {
            while (mptr->mptr)
                {
                if ((t0 < mptr->starttime) && (t1 > mptr->starttime))
                    {
                    MxTranslate((double)center[0],
                                (double)center[1],
                                (double)center[2],T);
                    MxMultiply(T,N,T);
                    MxMultiply(T,P,T);
                    MxMultiply(T,S,T);
                    boundsphere(sptr->radius,T,&w1);

if (w0.minx > w1.minx) w0.minx = w1.minx;
                    if (w0.miny > w1.miny) w0.miny = w1.miny;
                    if (w0.maxx < w1.maxx) w0.maxx = w1.maxx;
                    if (w0.maxy < w1.maxy) w0.maxy = w1.maxy;
                    }
                duration = mptr->mptr->starttime - mptr->starttime;
                VxAddLerp(duration,center,mptr->translate,center);
                mptr = mptr->mptr;
                } if ((t0 < mptr->starttime) && (t1 > mptr->starttime))
                {
                MxTranslate((double)center[0],
                            (double)center[1],
                            (double)center[2],T);
                MxMultiply(T,N,T);
                MxMultiply(T,P,T);
                MxMultiply(T,S,T);

boundsphere(sptr->radius,T,&w1);

if (w0.minx > w1.minx) w0.minx = w1.minx;
                if (w0.miny > w1.miny) w0.miny = w1.miny;
                if (w0.maxx < w1.maxx) w0.maxx = w1.maxx;
                if (w0.maxy < w1.maxy) w0.maxy = w1.maxy;
                }
            }
        }
    sptr->w = w0;
printf("%d:%d,%d,%d,%d\n",sptr,sptr->w.minx,sptr->w.maxx,sptr->w.miny,sptr->w.maxy);
/* Concatenate all of the current matrices that affect the sphere.
 * Let T be the concatenated matrix that transforms the sphere from
```

...remain

...remain

```
 * model space to object space (cms) to eye space (Neubl) to screen
 * space (NrPS).
 */
        }
    }
    for (sy = ystart-1; sy <= yend+1; sy++)
    {
        if (debug)
            {fprintf(stderr,"    ,%3d\r",sy);fflush(stdout);}
        cyclecolorlinebuffers();
        if (yactivespheres(sy))
        for (sx = 0; sx < spfx; sx++)
            if (xyactivespheres(sx,sy))
            {
                int ss;
                int timeoffset;
                if (debug)
                    {fprintf(stderr,"%3d\r",sx);fflush(stdout);}
                timeoffset = sx*6 + sy*4;
                for (ss = 0; ss < SS; ss++)
                {
                    pixel[ss]=eyetrace(
                        2*(sx+Location[ss].x+drand()/SS)/spfx - 1,
                        1 - 2*(sy+Location[ss].y+drand()/SS)/spfy,
                        t0 + (t1-t0)*(Times[(ss+timeoffset)%SS]+drand()/SS));
                }
                accumulateSS(pixel,sx+pps);
            }
        if ((sy != ystart-1) && (sy != yend+1))
            writecolorlinebuffers();
    }
    if (!picPutEncodeScanline(picfile))
        printf("sphere: trouble writing tile in %s\n", argv[1]);
    PicClose(picfile);
}

RGBAPixelType *RGBAline;

struct color **colorlineptr;
writecolorlinebuffers()                                         writecolorlinebuffers
{
    int i;
    for (i = 0; i < pps; i++)
    {
        converttoRGBAline(colorlineptr[i]+2);
        picEncodeScanline(picfile,RGBAline);
    }
}
allocatecolorlinebuffers()                                      allocatecolorlinebuffers
                                                             ...allocatecolorlinebuffers
{
    int i;
    RGBAline = (RGBAPixelType *)malloc((unsigned)sizeof(RGBAPixelType)*pfx);
    colorlineptr = (struct color **)malloc((unsigned)sizeof(struct color *)*(pps+2));
    for (i = 0; i < pps+2; i++)
        colorlineptr[i] = (struct color *)malloc((unsigned)sizeof(struct color)*(pps*spfx+2));
}
cyclecolorlinebuffers()                                         cyclecolorlinebuffers
{
    int i,j;
    struct color *temp0, *temp1;
    struct color *colorptr;

temp0 = colorlineptr[pps];
    temp1 = colorlineptr[pps+1];
    for (i = pps+1; i >= 2; i--)
    {
        colorptr = colorlineptr[i] = colorlineptr[i-2];
        for (j = pps*spfx+2; j > 0; j--)
            *colorptr++ = nullcolor;
    }
    colorlineptr[0] = temp0;
    colorlineptr[1] = temp1;
}
converttoRGBAline(colorlineptr)                                 converttoRGBAline
struct color *colorlineptr;
{
    RGBAPixelType *RGBAlineptr;
    int x;
    for (x = 0,RGBAlineptr = RGBAline; x < pfx; x++,RGBAlineptr++,colorlineptr++)
    {
        RGBAlineptr->Red   =pv12(colorlineptr->red);
        RGBAlineptr->Green =pv12(colorlineptr->grn);
        RGBAlineptr->Blue  =pv12(colorlineptr->blu);
        RGBAlineptr->Alpha =pv12(colorlineptr->alf);
    }
}
xyactivespheres(sx,sy)                                          xyactivespheres
```

```
{
    struct sphere *p;
    int flag;
    flag = 0;
    for(p=sphere;p != esphere;p++)
        {
        flag |=
        p->active =
                ((( sx >= p->w.minx-dms) && (sx <= p->w.maxx+dms)) &&
                ((sy >= p->w.miny-dms) && (sy <= p->w.maxy+dms)));
/*printf("%d:%d\n",p,p->active);*/
        }
    return(flag);
}
yactivespheres(sy)                                                          yactivespheres
{
    struct sphere *p;
    int flag;
    flag = 0;
    for(p=sphere;p != esphere;p++)
        {
        flag |=
        p->active = ((sy >= p->w.miny-dms) && (sy <= p->w.maxy+dms));
                                                                           ...yactivespheres
/*printf("%d:%d\n",p,p->active);*/
        }
    return(flag);
/*
    The active flag indicates that the sphere touches this scanline.
    This can be answered by intersecting the plane determined by the
    point of view with the scanline with the sphere. Actually, of
    course, the plane is 3d, one scanline high; the sphere is 4d,
    moving as it does through time.
    A simple approximation to reduce the plane back down to 2d is
    to intersect it with a sphere larger in radius by one extra
    scanline.
    Furthermore, the moving sphere can be neglected by using the
    average of the two sphere centers, with a radius increased by
    half the difference.
*/
} accumulateSS(pSSptr,x)                                                      accumulateSS
struct color *pSSptr;
{
    int ss;
    int i,j,k,l,m;
    float *fptr;
    float f;
    struct color *colorptr;

ss = 0;
    for (j = 0; j < pps; j++)
        {
        for (i = 0; i < pps; i++)
            {
            for (k = rpp; k > 0; k--)
                {
                int xoffset,yoffset;
                fptr = &Filter[ssize][ss][0][0];
                xoffset = Location[ss].x*pps;
                yoffset = Location[ss].y*pps;
                for (m = 0; m < 3; m++)
                    {
                    colorptr = colorlineptr[yoffset+m]+xoffset+x;
                    for (l = 0; l < 3; l++)
                        {
                        f = *fptr++;
                        colorptr->red += pSSptr->red*f;
                        colorptr->grn += pSSptr->grn*f;
                        colorptr->blu += pSSptr->blu*f;
                        colorptr->alf += pSSptr->alf*f;
                        colorptr++;
                        }
                    }
                pSSptr++; ss++;
                }
            }
        }
} main(argc, argv)                                                            main
char *argv[];
{
    argc = do_aargs(cmd,argc,argv);
    if (aa_helpflag) exit(0);
    if (argc < 2)
        {printf("Usage: gt filename\n");exit(1);}
    remain(argc, argv);
                                                                            ...main
}
```

It is claimed:

1. In a method of forming an image frame that individually specifies the characteristic information of each pixel of an array of pixels that forms said frame, wherein objects to be included in said image frame are represented by data stored in a computer data base that specifies visual characteristics of said objects for said image frame, a method of accessing the information of the computer data base for determining the characteristic information of each pixel, comprising performance of the following steps:

spatially dividing the area of said pixel into a plurality of non-overlapping areas;

pseudo-randomly positioning a sample point within substantially each of said areas, thereby to determine the pseudo random position of a plurality of sample points for each pixel;

determining from the computer data base the characteristic information of said objects at each of the plurality of pseudo random sample points for each pixel of said frame;

combining the characteristic information of the samples in each pixel, thereby to determine a single characteristic information of each pixel, and;

constraining said positioning of said sample point such that a Fourier transform over a distribution of said sample points over an infinite extent contains substantially continuous regions.

* * * * *

UNITED STATES PATENT AND TRADEMARK OFFICE
Certificate

Patent No. 5,239,624            Patented: August 24, 1993

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Robert L. Cook, San Anselmo, CA; Thomas K. Porter, Fairfax, CA; Loren C. Carpenter, Novato, CA; and Rodney Stock, Novato, CA.

Signed and Sealed this Eleventh Day of November 2003.

HEATHER R. HERNDON
*Supervisory Patent Examiner*
*Art Unit 2178*